United States Patent
Bohls et al.

(10) Patent No.: US 10,862,533 B2
(45) Date of Patent: Dec. 8, 2020

(54) LINE LOSS DETECTION IN A SIGNAL BOOSTER SYSTEM

(71) Applicant: WILSON ELECTRONICS, LLC, St. George, UT (US)

(72) Inventors: Douglas Edward Bohls, Allen, TX (US); William Thornton, Plano, TX (US); Dale Robert Anderson, Colleyville, TX (US); Glen Raggio, Mesquite, TX (US); Christopher Ken Ashworth, St. George, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 16/231,146

(22) Filed: Dec. 21, 2018

(65) Prior Publication Data

US 2019/0222258 A1    Jul. 18, 2019

Related U.S. Application Data

(60) Provisional application No. 62/780,831, filed on Dec. 17, 2018, provisional application No. 62/613,706, filed on Jan. 4, 2018.

(51) Int. Cl.
*H04B 3/36* (2006.01)
*H04L 25/20* (2006.01)
(Continued)

(52) U.S. Cl.
CPC ............ *H04B 3/36* (2013.01); *H04B 3/30* (2013.01); *H04B 3/44* (2013.01); *H04B 3/46* (2013.01);
(Continued)

(58) Field of Classification Search
CPC ... H04B 1/38; H04B 1/40; H04B 3/20; H04B 3/21; H04B 3/30; H04B 3/36; H04B 3/38;
(Continued)

(56) References Cited

U.S. PATENT DOCUMENTS 4,776,032 A    10/1988 Odate et al.
5,303,395 A    4/1994 Dayani
(Continued)

FOREIGN PATENT DOCUMENTS

EP    1525678 B1    7/2008

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.
(Continued)

*Primary Examiner* — Young T. Tse

(57) ABSTRACT

Technology for a repeater system is disclosed. The repeater system can include a first repeater. The repeater system can include a second repeater that is communicatively coupled to the first repeater via a transmission line between the first repeater and the second repeater. The first repeater can include a controller operable to determine that a change in loss across the transmission line between the first repeater and the second repeater has occurred based on signaling between the first repeater and the second repeater.

31 Claims, 12 Drawing Sheets

(51) Int. Cl.
*H04B 3/30* (2006.01)
*H04B 3/44* (2006.01)
*H04B 3/46* (2015.01)
*H04B 7/155* (2006.01)

(52) U.S. Cl.
CPC ......... *H04B 7/15535* (2013.01); *H04L 25/20* (2013.01); *H04B 2203/5479* (2013.01)

(58) Field of Classification Search
CPC ... H04B 3/44; H04B 3/46; H04B 3/50; H04B 7/15535; H04B 2003/5479; H04L 25/20
USPC ....... 375/211, 213, 219, 220, 222, 224, 225, 375/227, 228, 257; 370/278, 279, 282, 370/293, 297; 455/500, 513, 67.11, 67.13
See application file for complete search history.

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,359,713 B1 * | 3/2002 | DeCusatis | H04B 10/29 398/178 |
| 6,711,388 B1 | 3/2004 | Neitiniemi | |
| 6,819,936 B2 * | 11/2004 | Weissman | H04W 52/52 455/522 |
| 6,889,033 B2 | 5/2005 | Bongfeldt | |
| 6,990,313 B1 | 1/2006 | Yarkosky | |
| 7,024,231 B2 * | 4/2006 | Cohen | H03F 1/0288 455/127.3 |
| 7,035,587 B1 | 4/2006 | Yarkosky | |
| 7,221,967 B2 | 5/2007 | Van Buren et al. | |
| 7,974,573 B2 | 7/2011 | Dean | |
| 9,130,641 B2 | 9/2015 | Mohebbi | |
| 2002/0044336 A1 | 4/2002 | Tanaka et al. | |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2009/0290526 A1 * | 11/2009 | Gainey | H04B 7/155 370/315 |
| 2011/0151775 A1 | 6/2011 | Kang et al. | |
| 2015/0011157 A1 | 1/2015 | Terry | |
| 2018/0062774 A1 * | 3/2018 | Blandino | H04B 17/17 |
| 2018/0139627 A1 * | 5/2018 | Ashworth | H04B 7/026 |
| 2018/0147946 A1 * | 5/2018 | Tagawa | B60W 20/13 |

OTHER PUBLICATIONS

ADL5513; "1 MHz to 4 GHz, 80 dB Logarithmic Detector/Controller"; Data Sheet; (2008); 12 pages; Analog Devices, Inc.
HMC713LP3E; "54 dB, Logarithmic Detector / Controller, 50-8000 MHz"; Data Sheet; (2010); 12 pages.
HMC909LP4E; "RMS Power Detector Single-Ended, DC—5.8 GHz"; Data Sheet; (2010); 21 pages.
PIC16F873; "28/40-Pin 8-Bit CMOS Flash Microcontrollers"; (2001); Data Sheet; 218 pages.
European Search Report dated May 8, 2019, in EP Application No. 18215360.1, filed Dec. 21, 2018; 2 pages.

\* cited by examiner

LINE LOSS DETECTION IN A SIGNAL BOOSTER SYSTEM

RELATED APPLICATIONS

The present application claims the benefit of U.S. Provisional Patent Application No. 62/613,706, filed Jan. 4, 2018 and the benefit of U.S. Provisional Patent Application No. 62/780,831, filed Dec. 17, 2018, the entire specifications of which are hereby incorporated by reference in their entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
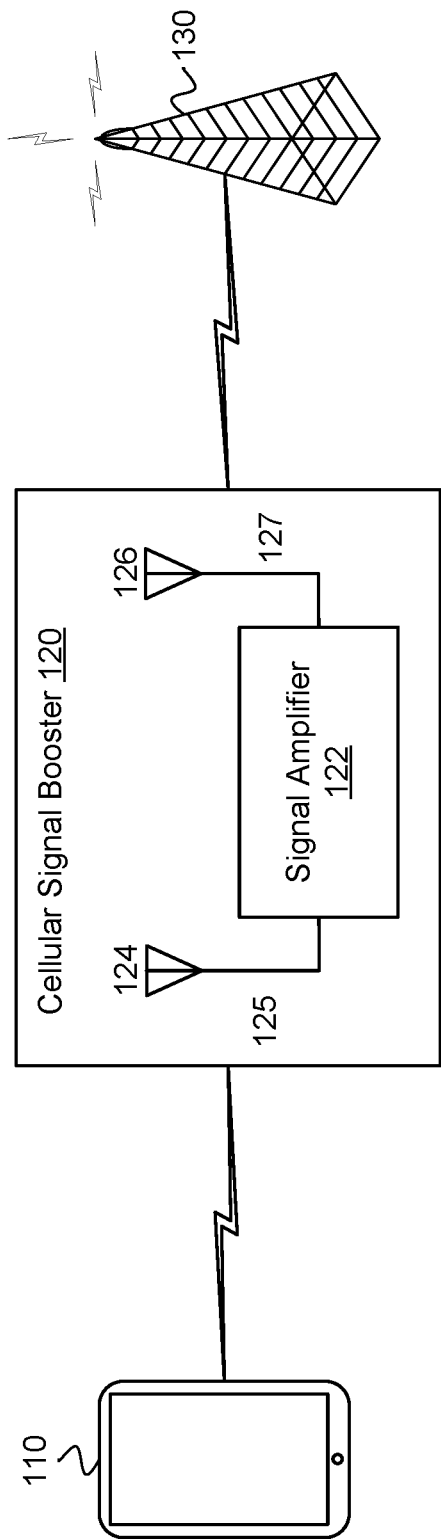
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 15.0.0 (January 2018) or other desired releases. The signal booster 120 can boost signals from the 3GPP Technical Specification (TS) 36.101 (Release 15 Sep. 2017) bands or LTE frequency bands. For example, the signal booster 120 can boost signals from the LTE frequency bands: 2, 4, 5, 12, 13, 17, 25, and 26. In addition, the signal booster 120 can boost selected frequency bands based on the country or region in which the signal booster is used, including any of bands 1-85 or other bands, as disclosed in 3GPP TS 36.104 V15.3.0 (2018-07).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 110 and transmit DL signals to the wireless device 110 using a single antenna. Alternatively, the integrated device antenna 124 can receive UL signals from the wireless device 110 using a dedicated UL antenna, and the integrated device antenna 124 can transmit DL signals to the wireless device 110 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
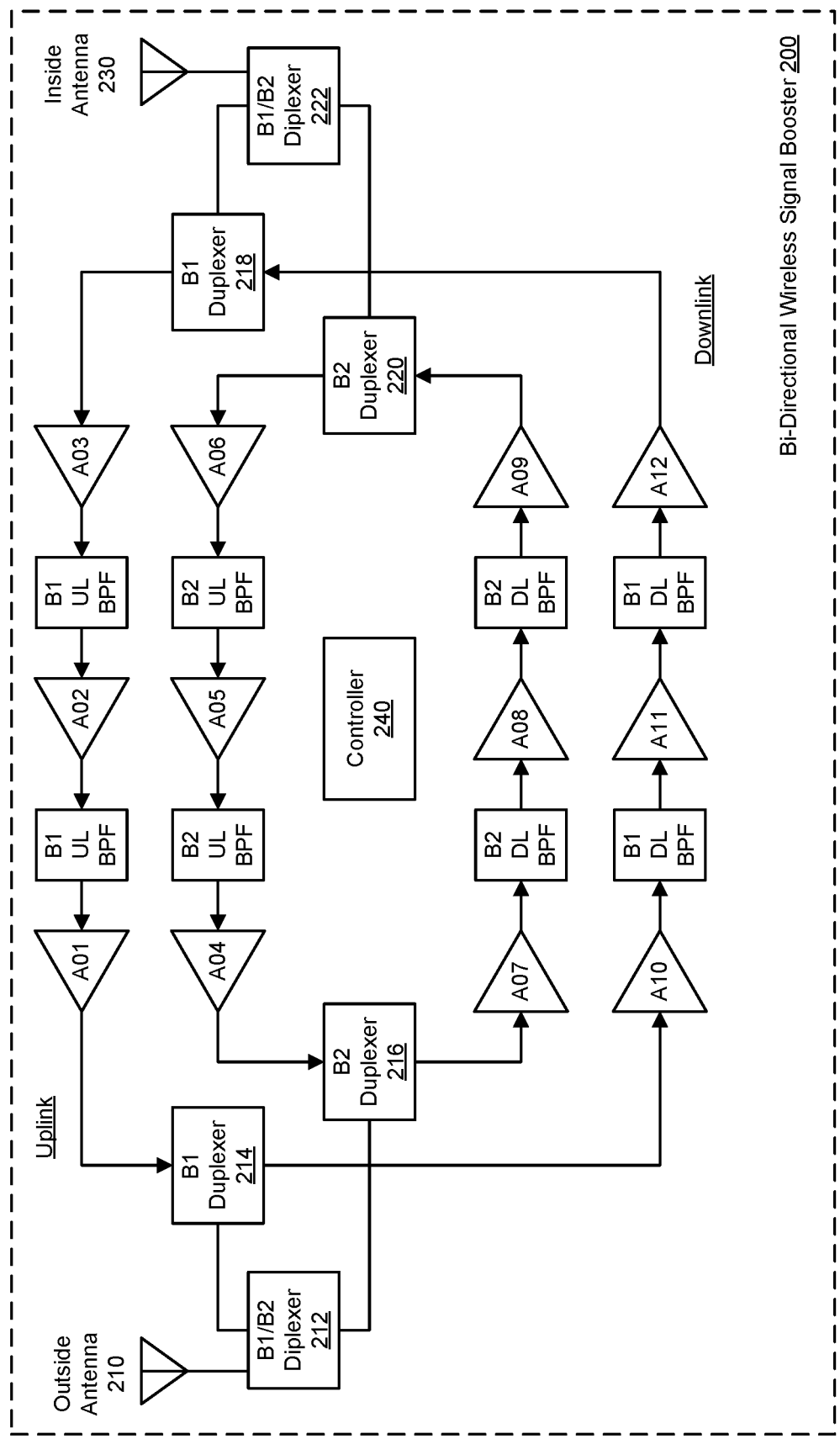
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. An outside antenna 210, or an integrated node antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to an inside antenna 230, or an integrated device antenna. The inside antenna 230 can communicate the amplified downlink signal to a wireless device (not shown), such as a mobile phone.

In one example, the inside antenna 230 can receive an uplink (UL) signal from the wireless device. The uplink signal can be provided to the second B1/B2 diplexer 222.

The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 220. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 212. The first B1/B2 diplexer 212 can provide an amplified uplink signal to the outside antenna 210. The outside antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

In one configuration, a signal booster system (or repeater system) can improve cellular service in a building. The signal booster system can be a cascaded inline booster system, which includes inline signal booster(s) (or inline repeaters) that are connected to a main signal booster (or main repeater) using a variable length transmission line. The transmission line can include a coaxial cable, a twisted pair, a twisted shielded pair, or a planar transmission line, such as a strip line or micro strip. The main signal booster can communicate with the inline signal booster(s) over variable length transmission line(s). In one example, the inline signal booster can only function along with the main signal booster, or alternatively, the inline signal booster can function independent of the main signal booster. The main signal booster can be communicatively coupled to an outside antenna (or donor antenna) via an outside antenna port (or donor antenna port). The inline signal booster(s) can be connected in series or in parallel. For example, inline signal boosters(s) in parallel can each be connected to an inside antenna (or server antenna) via respective inside antenna ports (or server antenna ports), whereas inline signal booster(s) in series can be connected to a single inside antenna (or server antenna) via an inside antenna port (or server antenna port) on a last inline signal booster in the series. The inline signal booster(s) can augment a signal boosting capability of the main signal booster. In addition, the inline signal booster(s) can mitigate a transmission line loss, thereby providing an improved physical reach as compared to a conventional single booster system. In other words, a cascaded inline booster system with a main signal booster and multiple inline signal boosters that are spread throughout a building (connected via transmission lines of variable lengths) can provide an improved signal boosting capability for the building as compared to the conventional single booster system.

In one example, the main signal booster in the signal booster system can include uplink automatic gain control (AGC) and downlink AGC. The uplink AGC can function to adjust an uplink gain or noise power and the downlink AGC can function to adjust a downlink gain or noise power. The uplink AGC in the main signal booster can adjust the uplink gain or noise power to meet a network protection standard. The AGC control functions in the main signal booster can maintain the network protection standards for uplink and downlink, as required in Part 20 of the FCC Consumer Booster Rules. The main signal booster in the signal booster system can include both uplink AGC and downlink AGC control functions, but may still suffer from a suboptimal uplink power/linearity performance when the signal booster system is gain-limited for a downlink AGC differential. Therefore, it can be advantageous for the inline signal booster in the signal booster system to also include uplink AGC, which can optimize power/linearity for the signal booster system. In this example, the main signal booster can include system downlink AGC control functions, while both the main signal booster and the inline signal booster can include inter-dependent system uplink AGC control functions, which can be configured to maintain network protection standards.

In one example, gain control information can be transmitted between the main signal booster and the inline signal booster via a communication link between the main signal booster and the inline signal booster. The gain control information can enable the inline signal booster to adjust the uplink AGC. In one example, the communication link can be an ISM band communication link between the main signal booster and the inline signal booster. The band communication link can be used to transmit the gain control information at approximately 430 MHz. In other words, the transmission of the gain control information can be an ISM 430 MHz data communication transmission between the main signal booster and the inline signal booster. Alternatively, the communication link can be in a defined band that is not used by the signal booster system to boost signals. For example, an off-band communication channel can be used for the data communication transmission.

In one example, an installation of the signal booster system can involve installing the main signal booster in the building and then connecting the main signal booster to the inline signal booster (or multiple inline signal booster) via the transmission line(s). During installation, a calibration process can be performed, which can measure an amount of transmission line loss on the transmission line connecting the main signal booster to the inline signal booster. The transmission line loss can be measured during the calibration process in order to determine a default distribution of system gain for the signal booster system (e.g., the uplink AGC at the main signal booster versus the uplink AGC at the inline signal booster).

In one example, the calibration process can involve sending radio frequency (RF) reference signals between the main signal booster and the inline signal booster to measure the transmission line loss. The transmission line loss can be a function of a length (L) of the transmission line connecting the main signal booster to the inline signal booster. For example, in order to calibrate the transmission line loss between the main signal booster and the inline signal booster, the calibration process can involve sending a defined set of RF calibration tones through the transmission line between the main signal booster and the inline signal booster. The defined set of RF calibration tones can be sent by the main signal booster and received by the inline signal booster, or alternatively, the defined set of RF calibration tones can be sent by the inline signal booster and received by the main signal booster. The defined set of RF calibration tones can be relatively close to operating band(s) of the signal booster system, but are not within the actual booster bands. The calibration process can involve sending RF calibration tones at a high band (e.g., around a few gigahertz) and at a low band (e.g., less than one gigahertz) in order to determine the transmission line loss over a defined frequency. The booster that receives the defined set of RF calibration tones (i.e., the main signal booster or the inline signal booster) can perform measurements of the RF calibration tones, which can be used to derive the transmission line loss. An indication of the transmission line loss can be saved at the main signal booster and/or the inline signal booster, and can be used for gain control (or AGC) in the signal booster system.

In previous solutions, after installation of the signal booster system and completion of the calibration process, the signal booster system would go into a normal operation mode, and the calibration process would not be repeated. In other words, in previous solutions, the signal booster system would operate based on the transmission line loss determined during the calibration process, and the signal booster system would not be recalibrated even when a change occurred to the transmission line loss.

In one configuration, in the present technology, after the calibration process and during the normal operation mode of the signal booster system, changes in the transmission line loss in the transmission line connecting the main signal booster and the inline signal booster can be monitored or detected. These changes can result from accidental damage to the transmission line, or due to deliberate tampering of the transmission line and/or the signal booster system. The changes in the transmission line loss can be monitored or detected based on an ISM band communication link strength during operation of the inline signal booster and the main signal booster. In other words, a change in signal strength of the ISM band communication link between the inline signal booster and the main signal booster can be an indication of a change in the transmission line loss. For example, when a received signal strength indicator (RSSI) of a signal (e.g., for gain control information) received over the ISM band communication link is below a defined threshold, this can indicate that the ISM band communication link strength has degraded, which can indicate a potential change in the transmission line loss of the transmission line connecting the main signal booster and the inline signal booster. The defined threshold for the RSSI can be set depending on a typical RSSI of ISM band signals communicated between the inline signal booster and the main signal booster. In addition, changes in the transmission line loss due to damage to the transmission line or tampering of the transmission line can result in changes to the RSSI of the ISM band signals communicated between the inline signal booster and the main signal booster, and the changes to the RSSI can cause the RSSI to be below the defined threshold. For example, tampering with the transmission line by shortening a length of the transmission line can result in changes to the RSSI of the ISM band signals communicated between the inline signal booster and the main signal booster, and these changes can be detected.

In one example, the calibration sequence and the recalibration sequence can involve sending RF calibration tones that are outside the 430 MHz frequency being used within the ISM band to send the gain control information. As a result, the RF calibration tones do not interfere with ISM band data communications (e.g., gain control information) between the main signal booster and the inline signal booster.

Figure 3A:
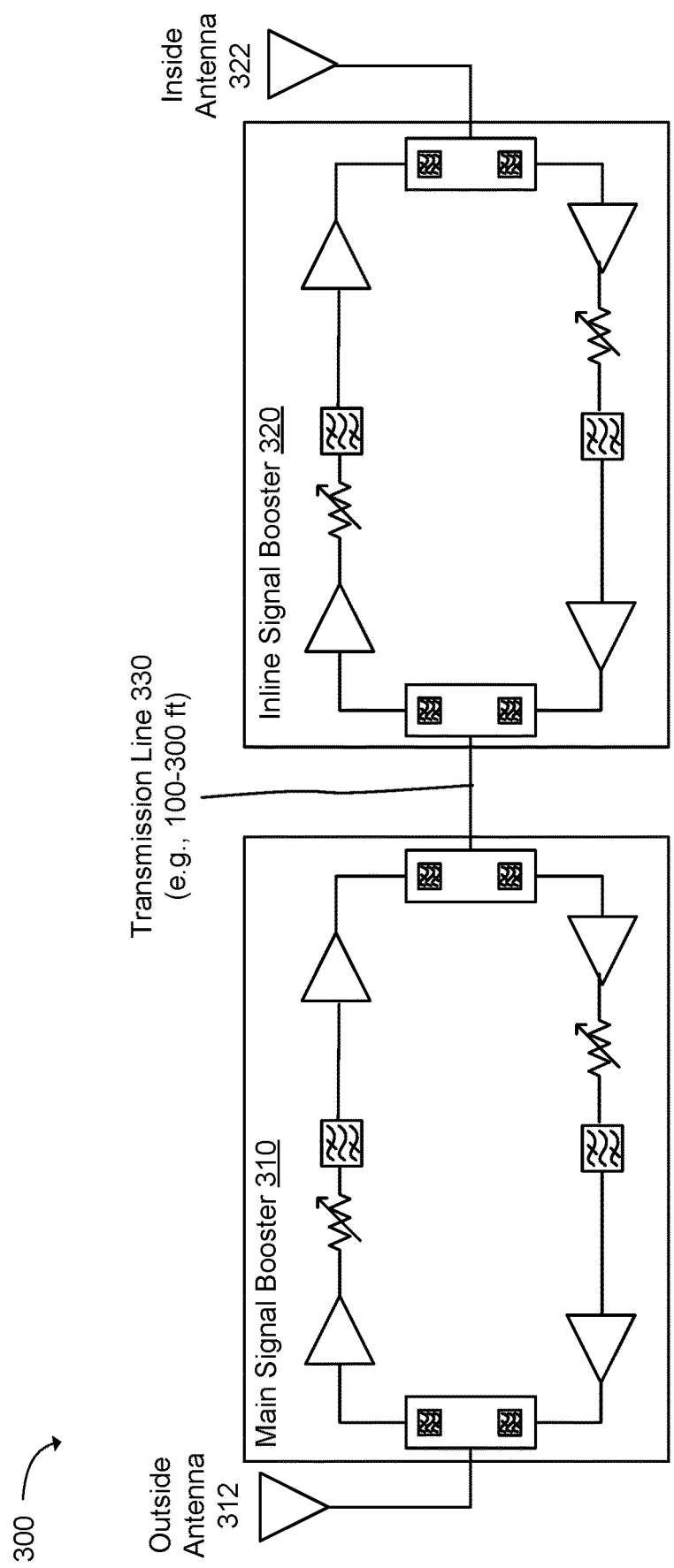
FIG. 3a illustrates a signal booster system that includes a main signal booster and an inline signal booster in accordance with an example.

FIG. 3a illustrates an example of a signal booster system 300 that includes a main signal booster 310 and an inline signal booster 320. The main signal booster 310 can be communicatively coupled with the inline signal booster 320 via a transmission line 330, such as a coaxial cable (e.g., 100 to 300 feet in length). Alternatively, the transmission line 330 can be a twisted pair, a twisted shielded pair, or a planar transmission line, such as a strip line or micro strip. The main signal booster 310 can include an outside antenna 312 (or donor antenna) that can receive downlink signals from a base station (not shown) and transmit uplink signals to the base station. The inline signal booster 320 can include an inside antenna 322 (or server antenna) that can receive uplink signals from a mobile device (not shown) and transmit downlink signals to the mobile device.

Figure 3B:
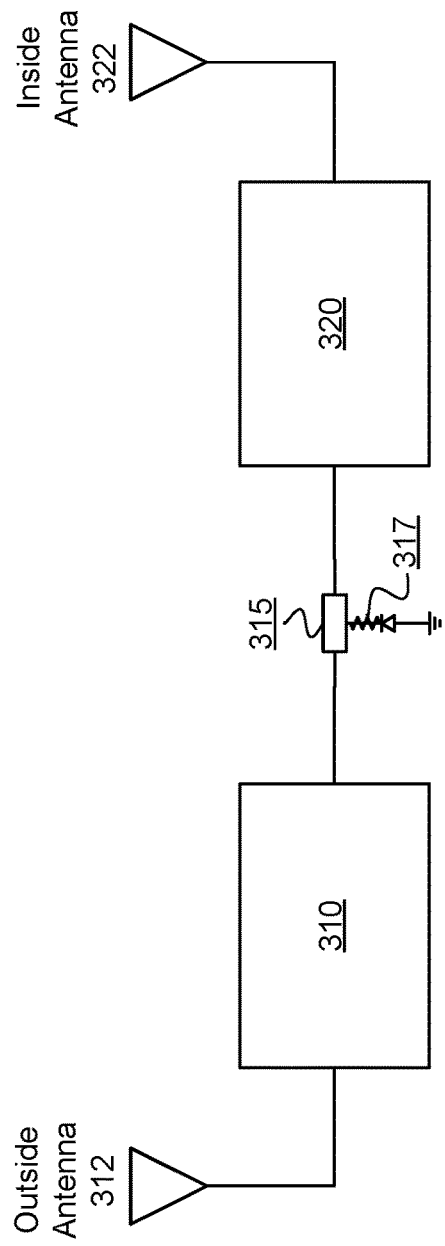
FIG. 3b illustrates a signal booster system with a splitter in accordance with an example.
Figure 3C:
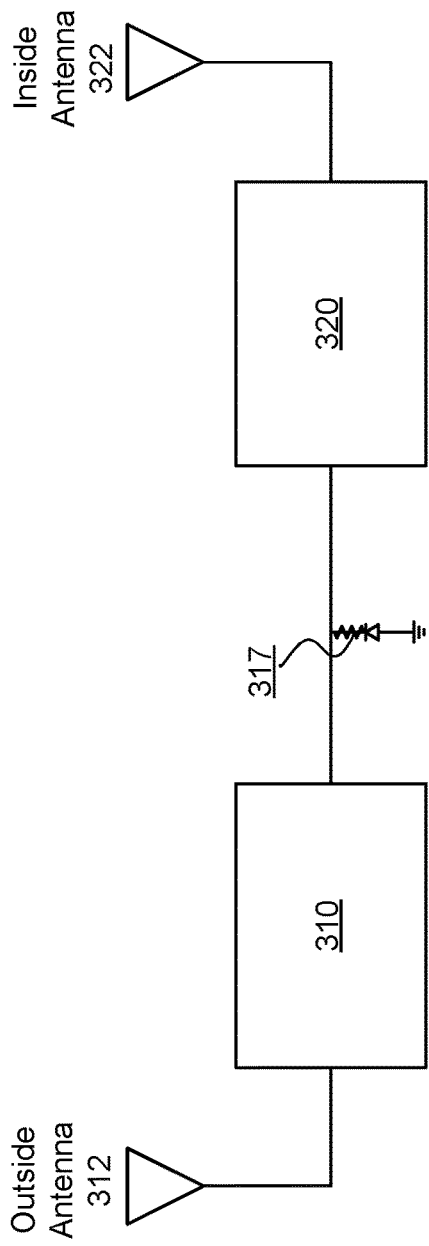
FIG. 3c illustrates a signal booster system with a tap circuit in accordance with an example.

In one example, the main signal booster 310 can be directly connected to the inline signal booster 320 via the transmission line 330. In an alternative example, a splitter (315 in FIG. 3b) and/or a tap circuit (317 in FIGS. 3b, 3c) can be inserted between the main signal booster 310 and the inline signal booster 320.

In one example, the main signal booster 310 can include one or more downlink amplification and filtering signals paths and one or more uplink amplification and filtering signal paths. The main signal booster 310 can include duplexers, diplexers, splitters, circulators, etc. to direct signals on the downlink and uplink amplification and filtering signal paths. Similarly, the inline signal booster 320 can include one or more downlink amplification and filtering signals paths and one or more uplink amplification and filtering signal paths. The inline signal booster 320 can include duplexers, diplexers, splitters, circulators, etc. to direct signals on the downlink and uplink amplification and filtering signal paths. In one example, the signal booster system 300 can be a 5-band or 7-band signal booster system. For example, the signal booster system 300 can be capable of boosting signals in high bands, such as band 4 (B4) and band 25 (B25), and the signal booster system 300 can be capable of boosting signals in low bands, such as band 5 (B5), band 12 (B12) and band 13 (B13).

In one example, the main signal booster 310 can receive a downlink signal from the base station via the outside antenna 312. The downlink signal can be directed to a downlink amplification and filtering path in the main signal booster 310. Then, the downlink signal can be directed onto the transmission line 330 that is connecting the main signal booster 310 and the inline signal booster 320. The downlink signal can be received at the inline signal booster 320, and then can be directed to a downlink amplification and filtering path in the inline signal booster 320. The downlink signal can be transmitted to the mobile device via the inside antenna 322. In another example, the inline signal booster 320 can receive an uplink signal from the mobile device via the inside antenna 322. The uplink signal can be directed to an uplink amplification and filtering path in the inline signal booster 320. Then, the uplink signal can be directed onto the transmission line 330 that is connecting the main signal booster 310 and the inline signal booster 320. The uplink signal can be received at the main signal booster 310, and then can be directed to an uplink amplification and filtering path in the main signal booster 310. The uplink signal can be transmitted to the base station via the outside antenna 312.

Figure 4:
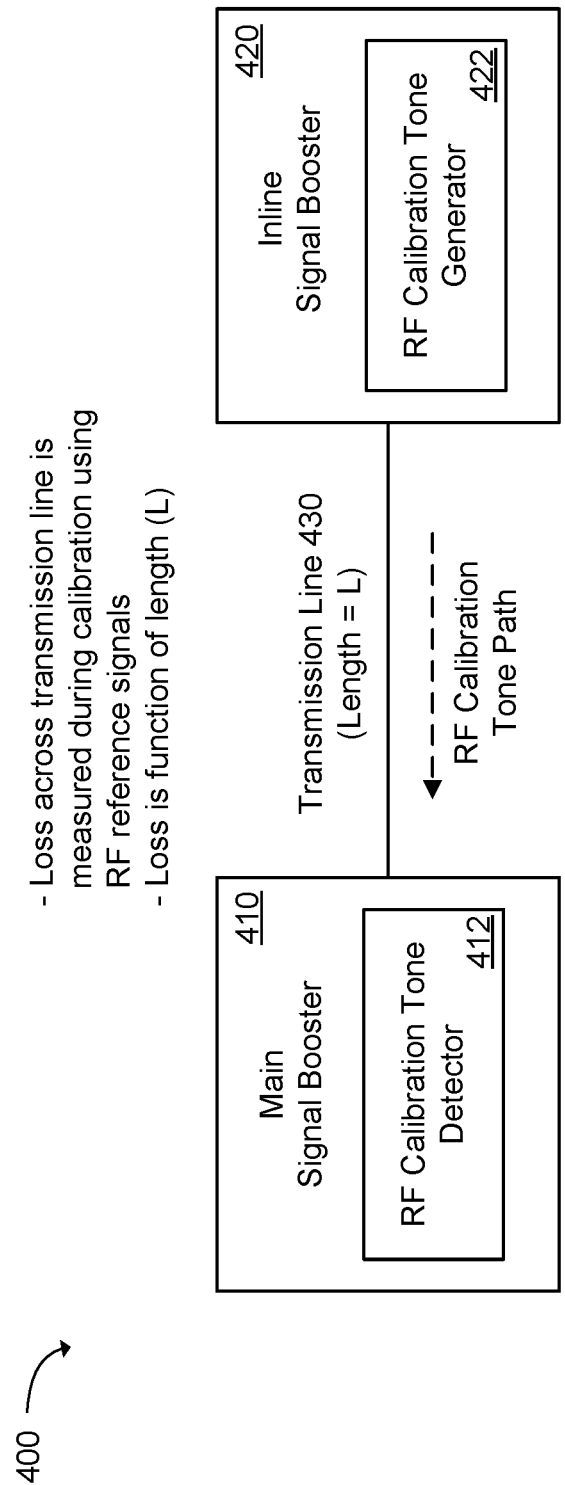
FIG. 4 illustrates a calibration procedure between a main signal booster and an inline signal booster in a signal booster system in accordance with an example.

FIG. 4 illustrates an example of a calibration procedure between a main signal booster 410 and an inline signal booster 420 in a signal booster system 400. The main signal booster 410 can be connected to the inline signal booster 420 via a transmission line 430 between the main signal booster 410 and the inline signal booster 420. In one example, the transmission line 430 can be a coaxial cable. The transmission line 430 can have a defined length (L). The calibration procedure can involve the inline signal booster 420 sending radio frequency (RF) reference signals to the main signal booster 410 over the transmission line 430. The main signal booster 410 can receive the RF reference signals from the inline signal booster 420, and the main signal booster 410 can measure a loss on the transmission line 430 based on the RF reference signals received from the inline signal booster 420. In one example, the loss can occur on the transmission line 430 over a defined frequency, so the loss can be a function of the length (L) of the transmission line 430.

In one example, the inline signal booster 420 can include an RF calibration tone generator 422 and the main signal booster can include an RF calibration tone detector 412. The RF calibration tone generator 422 in the inline signal booster 420 can send a defined set of RF calibration tones through the transmission line 430, and the RF calibration tones can be received at the RF calibration tone detector 412 in the main signal booster 410. The RF calibration tone detector 412 can receive the RF calibration tones through the transmission line 430, and the main signal booster 410 can determine the loss on the transmission line 430 based on the received RF calibration tones. In other words, the main signal booster 410 can perform measurements of the received RF calibration tones, which can be used to derive the loss on the transmission line 430. In this example, the loss on the transmission line 430 can be calibrated between the main signal booster 410 and the inline signal booster 420 based on the RF calibration tones received at the main signal booster 410. In addition, an indication of the loss on the transmission line 430 can be saved at the main signal booster 410, and the main signal booster 410 can use the indication of the loss on the transmission line 430 for gain control (or AGC) in the signal booster system 400.

In one example, calibration of the loss on the transmission line 430 can be performed at the main signal booster 410 by measuring an inline calibration RF signal source at the main signal booster 410. The RF calibration tone generator 422 in the inline signal booster 420 can generate RF calibration tones that are transmitted on an RF calibration tone path to the main signal booster 410, and these RF calibration tones can be relatively close to actual booster band frequencies (e.g., low band frequencies and high band frequencies). In other words, the RF calibration tones can be outside of the actual booster operating bands, as well as outside of an ISM band used for data communications between the main signal booster 410 and the inline signal booster 420.

In an alternative configuration, the main signal booster 410 can include an RF calibration tone generator and the inline signal booster 420 can include an RF calibration tone detector. In this configuration, the main signal booster 410 can generate the RF calibration tones and send the RF calibration tones to the inline signal booster 420. The inline signal booster 420 can determine the loss on the transmission line 430 based on the RF calibration tones received from the main signal booster 410.

In one configuration, during a calibration procedure, a first signal booster (e.g., the main signal booster 410) can send an RF calibration tone to a second signal booster (e.g., the inline signal booster 420) over a transmission line, and the second signal booster can detect an RSSI of the received RF calibration tone. The transmission line can have a certain voltage standing wave ratio (VSWR), so depending on an exact RF calibration tone that is sent from the first signal booster, the second signal booster can detect a varying RSSI for a received RF calibration tone. Therefore, an RF sweep (e.g., over a range of 2 megahertz (MHz) or 5 MHz or 10 MHz) can be performed during the calibration procedure, depending on a length of the transmission line. Since the RF calibration tones can include high band RF calibration tones and low band RF calibration tones, the RF sweep can be performed during the calibration process for both the high band and the low band. Based on the high band and low band RF sweeps, an average RSSI of the received RF calibration tones can be determined, which can result in a more accurate calibration. For example, ends of the transmission line can be connected to active components (e.g., diplexers, duplexers, etc. in the first signal booster and the second signal booster, respectively), which can cause VSWR ripple on an entire connection. As a result, an RSSI measurement of a received RF calibration tone can correspond to a peak or valley, which can affect the RSSI measurement by 1 or 2 dB during the calibration procedure. Therefore, RF sweeping the high and low bands during the calibration procedure can serve to calibrate out the VSWR ripple.

In one configuration, a first signal booster (e.g., the main signal booster 410) can initiate a calibration process between the first signal booster and a second signal booster (e.g., the inline signal booster 420). The calibration process can include transmitting a swept calibration signal over a defined frequency range from the first signal booster to the second signal booster. The calibration process can include receiving the swept calibration signal at the second signal booster. The calibration process can include measuring a power level of the swept calibration signal at the second signal booster at a plurality of frequencies within the defined frequency range. The calibration process can include processing, at the second signal booster, the measured power level at the plurality of frequencies. In one example, processing the measured power level at the plurality of frequencies can include averaging the measured power level at the plurality of frequencies. In addition, the swept calibration signal can be transmitted over the defined frequency range to mitigate a voltage standing wave ratio (VSWR) ripple over a transmission line between the first signal booster and the second signal booster.

Figure 5:
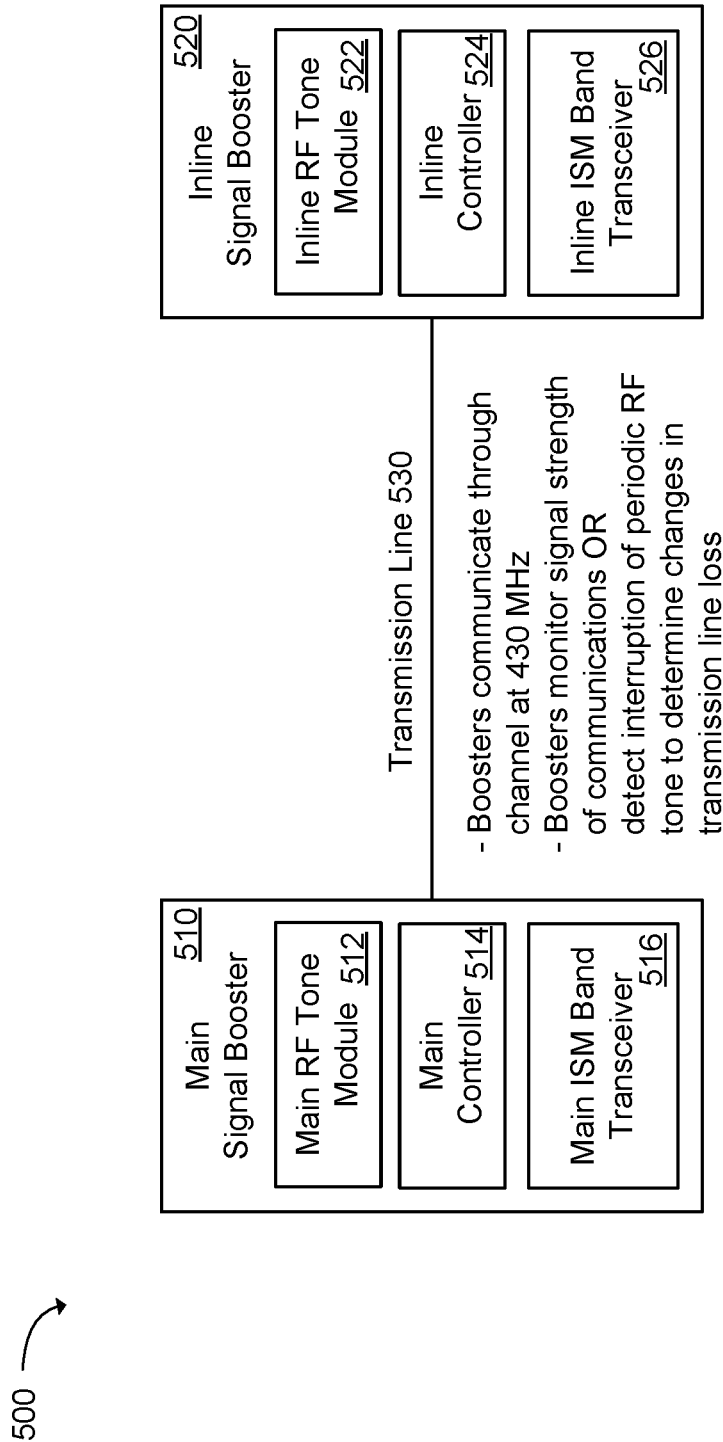
FIG. 5 illustrates a main signal booster that is coupled to an inline signal booster via a transmission line in accordance with an example.

FIG. 5 illustrates an example of a signal booster system 500 that includes a main signal booster 510 and an inline signal booster 520. The main signal booster 510 can be coupled to the inline signal booster 520 via a transmission line 530 between the main signal booster 510 and the inline signal booster 520. In one example, the transmission line 530 can be a coaxial cable. Alternatively, the transmission line 530 can be a twisted pair, a twisted shielded pair, or a planar transmission line, such as a strip line or micro strip. The main signal booster 510 can include a main ISM band transceiver 516 (or main ISM band Rx/Tx) and the inline signal booster 520 can include an inline ISM band transceiver 526 (or inline ISM band Rx/Tx). The main ISM band transceiver 516 and the inline ISM band transceiver 526 can enable data communications between the main signal booster 510 and the inline signal booster 520, respectively, which can be transmitted over the transmission line 530 via an ISM communication link. In other words, energy from the main ISM band transceiver 516 can be propagated along the transmission line 530, and then received at the inline ISM band transceiver 526, or vice versa.

In one example, the data communication between the main signal booster 510 and the inline signal booster 520 over the transmission line 530 via the ISM communication link (or an off-band communication channel) can include gain control information. The gain communication can be periodically communicated between the main signal booster 510 and the inline signal booster 520 over the transmission line 530 via the ISM communication link. In addition, an ISM band frequency for the ISM communication link (e.g., 430 MHz) can be away from booster band frequencies to reduce a likelihood of booster interference during operation of the signal booster system 500.

In one configuration, the main signal booster 510 can include a main controller 514. The main controller 514 can continuously monitor and track a signal strength of signals received from the inline signal booster 520 over the transmission line 530 via the ISM communication link during a period of time. For example, the main controller 514 can identify a signal (e.g., gain control information) received from the inline signal booster 520 over the transmission line 530 via the ISM communication link. The main controller 514 can determine an RSSI of the received signal (e.g., an ISM band signal at 430 MHz) received from the inline signal booster 520. The main controller 514 can compare the RSSI of the received signal to a defined threshold. The defined threshold can be set depending on a typical RSSI of ISM band signals communicated between the main signal booster 510 and the inline signal booster 520 over the transmission line 530 via the ISM communication link. When the RSSI of the received signal is below the defined threshold, the main controller 514 can determine that a signal strength of the ISM communication link has degraded, which can indicate a potential change in a loss of the transmission line 530 connecting the main signal booster 510 and the inline signal booster 520. In other words, the main controller 514 can monitor the signal strength of ISM band signals received from the inline signal booster 520, and an RSSI of an ISM band signal that is below the defined threshold can indicate that a previous calculation of the loss on the transmission line 530 is now outdated (i.e., a change in loss across an RF wired signal path or a change in transmission line loss).

In one example, changes in the loss on the transmission line 530 can be due to damage to the transmission line 530 or tampering of the transmission line 530. The damage and/or tampering of the transmission line 530 can result in changes to the RSSI of the ISM band signals communicated between the inline signal booster 520 and the main signal booster 510, and the changes to the RSSI can cause the RSSI to be below the defined threshold. For example, tampering with the transmission line 530 by shortening a length of the transmission line 530 can result in changes to the RSSI of the ISM band signals communicated between the inline signal booster 520 and the main signal booster 510.

In one example, in response to determining that the loss on the transmission line 530 has changed (inferring that the transmission line 530 has been accidentally damaged or deliberately tampered with), the main controller 514 can initiate a suitable action. For example, the main controller 514 can shut down the main signal booster 510 or initiate a recalibration sequence to determine an updated loss for the transmission line 530 connecting the main signal booster 510 and the inline signal booster 520. The recalibration sequence can involve resending a defined set of RF calibration tones through the transmission line 530 between the main signal booster 510 and the inline signal booster 520, which can be used to derive the updated loss on the transmission line 530. The updated loss on the transmission line 530 can be used for gain control (or AGC) in the signal booster system 500.

In one example, in response to determining that the loss on the transmission line 530 has changed, the main controller 514 can send an indication signal to an indicator of the signal booster system 500. For example, the indication signal can be sent to a display of the signal booster system 500. As a result, a user of the signal booster system 500 can be notified that the change in the loss on the transmission line 530 has occurred in the signal booster system.

In one example, the main controller 514 can determine that no signals have been received from the inline signal booster 520 over the transmission line 530 via the ISM communication link for a defined period of time. As a result, the main controller 514 can determine that the loss on the transmission line 530 has changed, and the main controller 514 can initiate a suitable action.

In another example, the inline signal booster 520 can include an inline controller 524. The inline controller 524 can identify a signal (e.g., gain control information) received from the main signal booster 510 over the transmission line 530 via the ISM communication link. The inline controller 524 can determine an RSSI of the received signal (e.g., an ISM band signal) received from the main signal booster 510. The inline controller 524 can compare the RSSI of the received signal to a defined threshold. When the RSSI of the received signal is below the defined threshold. In this case, the inline controller 524 can initiate the suitable action, such as initiating the recalibration sequence to determine the updated loss for the transmission line 530.

In an alternative configuration, the inline signal booster can include an inline RF tone module 522 that can continually send RF reference calibration tones over the transmission line 530. The RF reference calibration tones can be within a band that does not conflict with the ISM band signals communicated between the inline signal booster 520 and the main signal booster 510 (as well as outside of the operating band(s) of the signal booster system 500). These RF reference calibration tones can be received at a main RF tone module 512 in the main signal booster 510. The RF reference calibration tones can be transmitted in accordance with a defined periodicity (e.g., a few times a second or every few seconds). The main RF tone module 512 in the main signal booster 510 can continually monitor for the RF reference calibration tones that are received from the inline RF tone module 522.

When the main RF tone module 512 does not receive an RF reference calibration tone from the inline RF tone module 522 in the inline signal booster 520 for a defined period of time, the main RF tone module 512 can detect a disruption in the transmission line 530. In other words, a disruption in the transmission line 530 (e.g., damage to the transmission line 530 or tampering of the transmission line 530) can cause the main RF tone module 512 to not receive the RF reference calibration tone. In this case, the main controller 514 can determine that the loss on the transmission line 530 has changed, and the main controller 514 can initiate the suitable action (e.g., initiating the recalibration sequence to determine the updated loss for the transmission line 530). Thus, the main controller 514 can ensure that a connection is maintained between the main signal booster 510 and the inline signal booster 520 by detecting a disruption in a continuous stream of RF reference calibration tones. In this configuration, the main controller 514 can determine the changes to the loss on the transmission line

530 based on an interruption to the continuous stream of RF reference calibration tones, as opposed to a signal strength of ISM communications between the main signal booster 510 and the inline signal booster 520.

In one example, some of the RF reference calibration tones can have harmonics that fall within other bands. Therefore, filter(s) can be used at the main signal booster 510 and/or the inline signal booster 520 to avoid these harmonics. In addition, each filter can be for a particular band in a signal path of the main signal booster 510 and/or the inline signal booster 520.

In another example, the main RF tone module 512 can periodically send the RF reference calibration tones to the inline RF tone module 522. When the inline RF tone module 522 does not receive an RF reference calibration tone from the main RF tone module 512 for the defined period of time, the inline RF tone module 522 can detect the disruption in the transmission line 530. In this case, the inline controller 524 can determine that the loss on the transmission line 530 has changed, and the inline controller 524 can initiate the suitable action.

Figure 6:
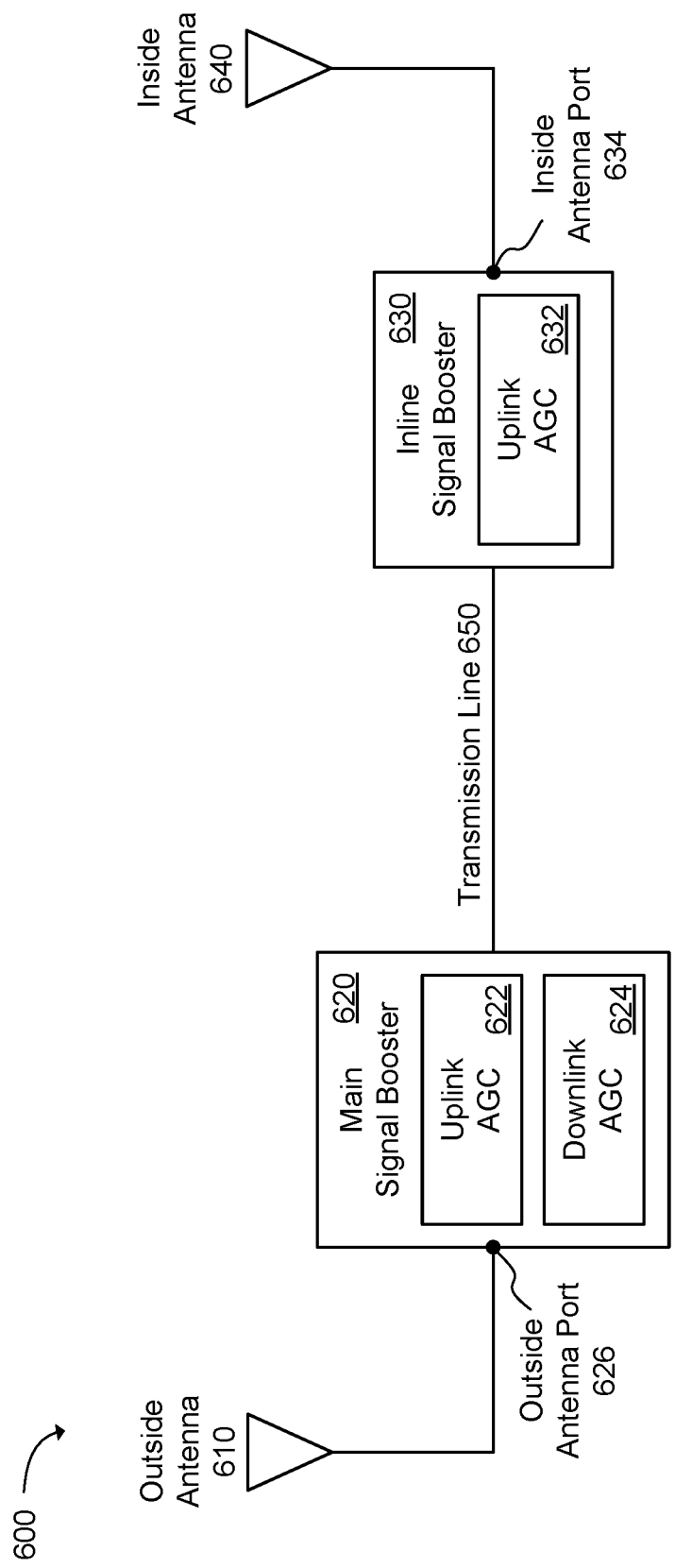
FIG. 6 illustrates a signal booster system that includes a main signal booster and an inline signal booster in accordance with an example.

FIG. 6 illustrates an exemplary signal booster system 600 (or repeater system) that includes a main signal booster 620 (or main repeater) that is communicatively coupled to an inline signal booster 630 (or inline repeater). The inline signal booster 630 can also be referred to as a secondary signal booster (or secondary repeater). The main signal booster 620 and the inline signal booster 630 can be communicatively coupled via a transmission line 650, such as a coaxial cable. Alternatively, the transmission line 650 can be a twisted pair, a twisted shielded pair, or a planar transmission line, such as a strip line or micro strip. The main signal booster 620 and the inline signal booster 630 can both function to filter and amplify uplink and downlink signals.

In one example, the main signal repeater 620 can be communicatively coupled to an outside antenna 610 (or donor antenna) via an outside antenna port 626 (or donor antenna port). The outside antenna 610 can be configured to transmit uplink signals to a base station (not shown) and receive downlink signals from the base station. In addition, the inline signal booster 630 can be communicatively coupled to an inside antenna 640 (or server antenna) via an inside antenna port 634 (or server antenna port). The inside antenna 640 can be configured to transmit downlink signals to a mobile device (not shown) and receive uplink signals from the mobile device.

In one example, the main signal booster 620 and the inline signal booster 630 can each include one or more downlink signal paths and one or more uplink signal paths. The downlink signal paths can include one or more amplifiers and one or more filters (e.g., analog filters) to amplify and filter downlink signals. Similarly, the uplink signal paths can include one or more amplifiers and one or more filters (e.g., analog filters) to amplify and filter uplink signals. In another example, the main signal booster 620 and the inline signal booster 630 can each be 5-band or 7-band signal boosters. As a non-limiting example, the main signal booster 620 and the inline signal booster 630 can be capable of boosting signals in B4, B5, B12, B13 and B25.

In one example, the main signal booster 620 can include an uplink automatic gain control (AGC) 622 and a downlink AGC 624. The uplink AGC 622 can be associated with one or more amplifiers for an uplink signal path of the main signal booster 620, and the downlink AGC 624 can be associated with one or more amplifiers for a downlink signal path of the main signal booster 620. The uplink AGC 622 can function to control an uplink gain of the uplink signal path in the main signal booster 620, and the downlink AGC 624 can function to control a downlink gain of the downlink signal path in the main signal booster 620. For example, the uplink AGC 622 can function to control the uplink gain of the uplink signal path in the main signal booster 620 order to meet network protection standards.

In one example, the inline signal booster 630 can include an uplink AGC 632. The uplink AGC 632 can be associated with one or more amplifiers for an uplink signal path of the inline signal booster 630. The uplink AGC 632 can function to control an uplink gain of the uplink signal path in the inline signal booster 632. For example, the uplink AGC 632 can function to control the uplink gain of the uplink signal path in the inline signal booster 632 in order to meet network protection standards.

In one configuration, the main signal booster 620 can receive a downlink signal from the base station via the outside antenna 610. In addition, the main signal booster 620 can receive an uplink signal from the inline signal booster 630. For example, the inline signal booster 630 can communicate uplink signals to the main signal booster 620 via the transmission line 650. The main signal booster 620 can determine dynamic gain control information based on a power level associated with the downlink signal received from the base station and/or a power level associated with the uplink signal received from the inline signal booster 630. For example, the dynamic gain control information can include downlink received signal strength indicator (RSSI) information and/or uplink RSSI information for the main signal booster 620.

In one example, the uplink AGC 622 in the main signal booster 620 can adjust an uplink gain or noise of the main signal booster 620 based on the dynamic control gain control information. In other words, the uplink AGC 622 in the main signal booster 620 can adjust an uplink gain or noise of the main signal booster 620 based on the downlink RSSI information and/or the uplink RSSI information. Thus, the main signal booster 620 can perform AGC (e.g., apply a dynamic uplink AGC setting) based on the dynamic gain control information. In addition, the main signal booster 620 can send the dynamic gain control information to the inline signal booster 630. The main signal booster 620 can send the dynamic gain control information at a periodic rate (e.g., once per second). In other words, in this example, the main signal booster 620 can send updated downlink and uplink RSSI information of the main signal booster 620 to the inline signal booster 630.

In one example, the main signal booster 620 can send the dynamic gain control information to the inline signal booster 630 via an ISM communication link between the main signal booster 620 and the inline signal booster 630. For example, the main signal booster 620 and the inline signal booster 630 can each include an ISM band transceiver, which can enable the dynamic gain control information to be sent from the main signal booster 620 and received at the inline signal booster 630.

In one example, the inline signal booster 630 can receive the dynamic gain control information from the main signal booster 620, and the uplink AGC 632 in the inline signal booster 630 can set an uplink gain or noise of the inline signal booster 630 based on the dynamic gain control information (e.g., the downlink RSSI information and/or the uplink RSSI information). Thus, the inline signal booster 630 can perform uplink AGC (e.g., apply a dynamic uplink AGC setting) based on the dynamic gain control information received from the main signal booster 620.

In one example, a default distribution of system gain for the signal booster system 600 (e.g., the uplink AGC 622 at the main signal booster 620 versus the uplink AGC 632 at the inline signal booster 630) can be determined during a field calibration. For example, the default distribution of system gain can depend on transmission line lengths (and corresponding transmission line losses) connecting the main signal booster 620 to the inline signal booster 630. The transmission line losses can be determined for the inline signal booster 630 during the field calibration. The default distribution of system gain can be a baseline for the main signal booster 620 and the inline signal booster 630 under a low level signal input. The default distribution of system gain can be a static gain setting (as determined during the field calibration) for the main signal booster 620 and the inline signal booster 630. In other words, the default distribution of system gain can be a static calibration setting (or baseline configuration setting) based on the transmission line lengths and corresponding transmission line losses.

After the field calibration, the signal booster system 600 can start operating in a normal mode. At this point, the distribution of system gain for the signal booster system 600 (e.g., the uplink AGC 622 at the main signal booster 620 versus the uplink AGC 632 at the inline signal booster 630) can be based dynamic input signal factors, such as dynamic gain control information that includes the downlink RSSI information and the uplink RSSI information. As the dynamic gain control information changes over a period of time, this dynamic distribution of system gain for the signal booster system 600 can be modified. For example, based on the dynamic gain control information, the main signal booster 620 can adjust its uplink AGC 622 accordingly and the inline signal booster 630 can adjust its uplink AGC 632 accordingly. In other words, the dynamic distribution of system gain is now based on a dynamic gain setting. The uplink AGC 622 of the main signal booster 620 and the uplink AGC 632 of the inline signal booster 630 can work cooperatively to control an overall system uplink gain of the signal booster system 600. The overall system uplink gain can be in compliance with a requirement of a regulatory body for a cellular consumer or commercial signal booster system. In addition, the dynamic gain control information can be communicated from the main signal booster 620 to the inline signal booster 630 in accordance with a timing that complies with a requirement of the regulatory body for the cellular consumer or commercial signal booster system.

In one example, an uplink AGC set point for the inline signal booster 630 can be determined during the field calibration. The uplink AGC set point can be based on a transmission line length (and corresponding transmission line loss) connecting the main signal booster 620 to the inline signal booster 630. The uplink AGC set points can correspond to a certain power level. When an uplink AGC set point is met at the inline signal booster 630 based on the dynamic gain control information received from the main signal booster 620, the inline signal booster 630 can adjust its uplink AGC 632 to maintain network protection requirements. On the other hand, when the inline signal booster 630 receives dynamic gain control information from the main signal booster 620 that does not satisfy the uplink AGC set point, the inline signal booster 630 may not adjust its uplink AGC 632.

Figure 7:
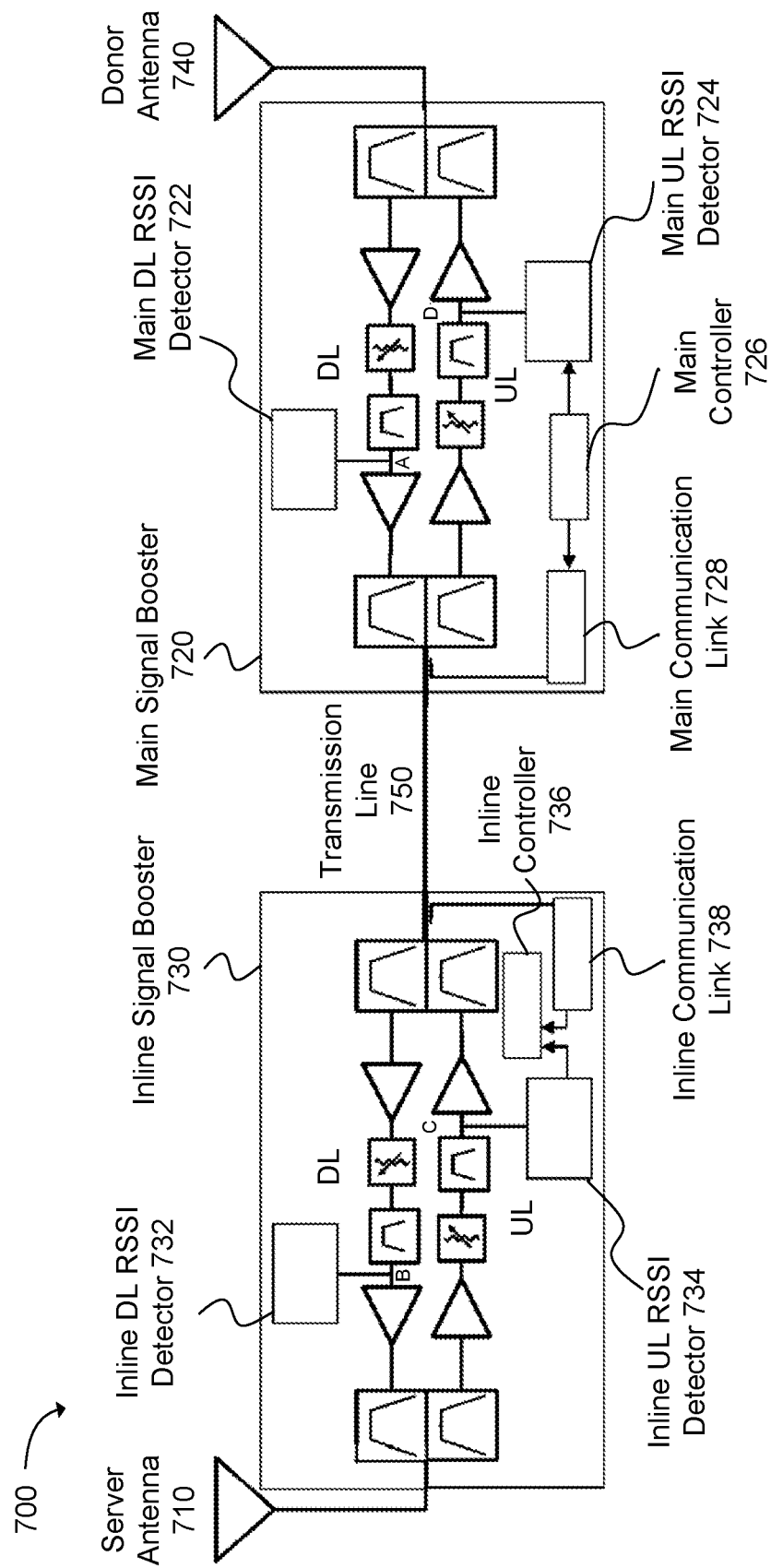
FIG. 7 illustrates a signal booster system that includes a main signal booster and an inline signal booster in accordance with an example.

FIG. 7 illustrates an example of a signal booster system 700 that includes a main signal booster 720 and an inline signal booster 730. The main signal booster 720 can be coupled to the inline signal booster 730 via a transmission line 750 between the main signal booster 720 and the inline signal booster 730. In one example, the transmission line 750 can be a coaxial cable. Alternatively, the transmission line 750 can be a radio frequency (RF) wired signal path, a twisted pair, a twisted shielded pair, or a planar transmission line, such as a strip line or micro strip.

In one example, the main signal booster 720 can include a main DL RSSI detector 722, a main UL RSSI detector 724, a main controller 726, and a main communication link 728 (or main ISM band transceiver). In another example, the inline signal booster 730 can include an inline DL RSSI detector 732, an inline UL RSSI detector 734, an inline controller 736, and an inline communication link 738 (or inline ISM band transceiver). In addition, the main signal booster 720 can be communicatively coupled to a donor antenna 740 (or outside antenna), and the inline signal booster 730 can be communicatively coupled to a server antenna 710 (or inside antenna).

In one example, the main signal booster 720 can receive a downlink signal from a base station via the donor antenna 740. The downlink signal can be provided to a downlink amplification and filtering signal path of the main signal booster 720. The main DL RSSI detector 722 can detect a DL RSSI of the downlink signal (at Point A). The downlink signal can be further provided to the inline signal booster 730 via the transmission line 750 between the main signal booster 720 and the inline signal booster 730. The downlink signal can be provided to a downlink amplification and filtering signal path of the inline signal booster 730. The inline DL RSSI detector 732 can detect a DL RSSI of the downlink signal (at Point B). The inline signal booster 730 can transmit the downlink signal to a mobile device via the server antenna 710.

In one example, the main controller 726 in the main signal booster 720 can determine the DL RSSI of the downlink signal (at Point A). The main controller 726 can send the DL RSSI of the downlink signal (at Point A) to the inline controller 736 in the inline signal booster 730. The inline controller 736 can also determine the DL RSSI of the downlink signal (at Point B). The inline controller 736 can compare the DL RSSI of the downlink signal (at Point A) with the DL RSSI of the downlink signal (at Point B), and based on the comparison, the inline controller 736 can determine that a difference between the DL RSSI of the downlink signal (at Point A) and the DL RSSI of the downlink signal (at Point B) exceeds a defined threshold. The defined threshold can account for a known gain between the main signal booster 720 and the inline signal booster 730. The inline controller 736 can determine that a change in loss across the transmission line 750 has occurred when the difference between the DL RSSI of the downlink signal (at Point A) and the DL RSSI of the downlink signal (at Point B) exceeds the defined threshold.

Alternatively, the main controller 726 can determine the DL RSSI of the downlink signal (at Point A) and receive an indication of the DL RSSI of the downlink signal (at Point B) from the inline controller 736. The main controller 726 can compare the DL RSSI of the downlink signal (at Point A) with the DL RSSI of the downlink signal (at Point B), and based on the comparison, the main controller 726 can determine that the difference between the DL RSSI of the downlink signal (at Point A) and the DL RSSI of the downlink signal (at Point B) exceeds the defined threshold. The main controller 726 can determine that the change in loss across the transmission line 750 has occurred when the difference between the DL RSSI of the downlink signal (at Point A) and the DL RSSI of the downlink signal (at Point B) exceeds the defined threshold.

In one example, the main signal booster 720 can apply a fixed amount of gain to downlink signals, and the inline signal booster 730 can apply a fixed amount of gain to downlink signals. Since the transmission line 750 can be calibrated between the main signal booster 720 and the inline signal booster 730, a total amount of gain between the main signal booster 720 and the inline signal booster 730 can be known for the downlink.

Therefore, based on the detected DL RSSI of the downlink signal at the main DL RSSI detector 722 (at Point A) and the known gain between the main signal booster 720 and the inline signal booster 730, the DL RSSI of the downlink signal at the inline DL RSSI detector 732 (at Point B) can be predicted. When the predicted DL RSSI of the downlink signal at the inline DL RSSI detector 732 (at Point B) differs from an actual DL RSSI of the downlink signal at the inline DL RSSI detector 732 (at Point B), a change in a transmission line loss in the transmission line 750 connecting the main signal booster 720 and the inline signal booster 730 can be detected by the main controller 726 and/or the inline controller 736. In other words, a difference between the detected DL RSSI of the downlink signal at the main DL RSSI detector 722 (at Point A) and the detected DL RSSI of the downlink signal at the inline DL RSSI detector 732 (at Point B) can correspond to the gain applied in the downlink between the inline signal booster 730 and the main signal booster 720, but when the difference diverges from the applied gain by the defined threshold, then the changes in the transmission line loss can be detected. These changes in the transmission line loss can result from accidental damage to the transmission line 750, or due to deliberate tampering of the transmission line 750 and/or the signal booster system 700.

In one example, the inline signal booster 730 can receive an uplink signal from the mobile device via the server antenna 710. The uplink signal can be provided to an uplink amplification and filtering signal path of the inline signal booster 730. The inline UL RSSI detector 734 can detect an UL RSSI of the uplink signal (at Point C). The uplink signal can be further provided to the main signal booster 720 via the transmission line 750 between the main signal booster 720 and the inline signal booster 730. The uplink signal can be provided to an uplink amplification and filtering signal path of the main signal booster 720. The main UL RSSI detector 724 can detect an UL RSSI of the uplink signal (at Point D). The main signal booster 720 can transmit the uplink signal to the base station via the donor antenna 740.

In one example, the inline controller 736 in the inline signal booster 730 can determine the UL RSSI of the uplink signal (at Point C). The inline controller 736 can send the UL RSSI of the uplink signal (at Point C) to the main controller 726 in the main signal booster 720. The main controller 726 can also determine the UL RSSI of the uplink signal (at Point D). The main controller 726 can compare the UL RSSI of the uplink signal (at Point C) with the UL RSSI of the uplink signal (at Point D), and based on the comparison, the main controller 726 can determine that a difference between the UL RSSI of the uplink signal (at Point C) and the UL RSSI of the uplink signal (at Point D) exceeds a defined threshold. The defined threshold can account for a known gain between the main signal booster 720 and the inline signal booster 730. The main controller 726 can determine that a change in loss across the transmission line 750 has occurred when the difference between the UL RSSI of the uplink signal (at Point C) and the UL RSSI of the uplink signal (at Point D) exceeds the defined threshold.

Alternatively, the inline controller 736 can determine the UL RSSI of the uplink signal (at Point C) and receive an indication of the UL RSSI of the uplink signal (at Point D) from the main controller 726. The inline controller 736 can compare the UL RSSI of the uplink signal (at Point C) with the UL RSSI of the uplink signal (at Point D), and based on the comparison, the inline controller 736 can determine that the difference between the UL RSSI of the uplink signal (at Point C) and the UL RSSI of the uplink signal (at Point D) exceeds the defined threshold. The inline controller 736 can determine that the change in loss across the transmission line 750 has occurred when the difference between the UL RSSI of the uplink signal (at Point C) and the UL RSSI of the uplink signal (at Point D) exceeds the defined threshold.

In one example, the main signal booster 720 can apply a fixed amount of gain to uplink signals, and the inline signal booster 730 can apply a fixed amount of gain to uplink signals. Since the transmission line 750 can be calibrated between the main signal booster 720 and the inline signal booster 730, a total amount of gain between the main signal booster 720 and the inline signal booster 730 can be known for the uplink.

Therefore, based on the detected UL RSSI of the uplink signal at the inline UL RSSI detector 734 (at Point C) and the known gain between the inline signal booster 730 and the main signal booster 720, the UL RSSI of the uplink signal at the main UL RSSI detector 724 (at Point D) can be predicted. When the predicted UL RSSI of the uplink signal at the main UL RSSI detector 724 (at Point D) differs from an actual UL RSSI of the uplink signal at the main UL RSSI detector 724 (at Point D), a change in a transmission line loss in the transmission line 750 connecting the main signal booster 720 and the inline signal booster 730 can be detected by the main controller 726 and/or the inline controller 736. In other words, a difference between the detected UL RSSI of the uplink signal at the inline UL RSSI detector 734 (at Point C) and the UL RSSI of the uplink signal at the main UL RSSI detector 724 (at Point D) can correspond to the gain applied in the uplink between the inline signal booster 730 and the main signal booster 720, but when the difference diverges from the applied gain by the defined threshold, then the changes in the transmission line loss can be detected.

In one example, with respect to coaxial cable link monitoring using RSSI, the UL RSSI for the inline signal booster 730 on a defined band (Band X) can be detected and compared to the UL RSSI for the main signal booster 720 on the defined band (Band X) in order to determine when a coaxial cable link connectivity is compromised during operation of the signal booster system 700. A gain between Point A in the main signal booster 720 and Point B in the inline signal booster 730 (as well as Point C in the inline signal booster 730 and Point D in the main signal booster 720) can be known and include a normal loss in the coaxial cable link. There can be an RSSI difference between Points A and B, as well as Points C and D, in the boosters due to the known gain. The changes in coaxial cable link insertion loss can be detected by monitoring for differences in the expected RSSI difference between Points A and B, as well as Points C and D, in the boosters.

In one configuration, the main controller 726 or the inline controller 736 can initiate a calibration procedure between the main signal booster 720 and the inline signal booster 730 when the change in loss is determined to occur across the transmission line 750 between the main signal booster 720 and the inline signal booster 730. As described earlier, the calibration procedure can involve the inline signal booster 730 sending radio frequency (RF) reference signals to the main signal booster 720 over the transmission line 750. The main signal booster 720 can receive the RF reference signals from the inline signal booster 730, and the main signal booster 720 can measure a loss on the transmission line 750 based on the RF reference signals received from the inline signal booster 730.

In one example, both DL RSSIs and UL RSSIs can be used to determine whether there are changes in transmission line loss between the main signal booster 720 and the inline signal booster 730. In certain situations, when there is a weak DL signal, only the UL RSSIs can be used to determine the changes, or vice versa.

In one configuration, the main controller 726 or the inline controller 736 can determine that the change in loss across the transmission line 750 has occurred for each band supported in the signal booster system 700. For example, when the signal booster system 700 supports 5 bands, the main controller 726 or the inline controller 736 can determine changes in loss for each of the 5 bands. As a result, the main DL RSSI detector 722, the main UL RSSI detector 724, the inline DL RSSI detector 732, and the inline UL RSSI detector 734 can be band-specific (i.e., the RSSI can be detected for a specific uplink or downlink frequency band, such as B5 or B12). In this example, multiple band paths can be simultaneously monitored in the 5-band signal booster system. For example, an RSSI difference can be monitored on 5 UL paths and 5 DL paths to determine a coaxial cable link integrity for all 5 bands. Generally, there can be different losses for different bands, as transmission line loss can vary over frequency. Thus, it can be advantageous for each band to have its own RSSI detection for both uplink and downlink.

In one configuration, the main communication link 728 (or main ISM band transceiver) and the inline communication link 738 (or inline ISM band transceiver) can also be used to determine whether there are changes in transmission line loss between the main signal booster 720 and the inline signal booster 730. As previously described, the main controller 726 can identify an industrial, scientific, and medical (ISM) signal received from the inline signal booster 730 via the transmission line 750. The main controller 726 can determine that a signal strength of the ISM signal received from the inline signal booster 730 is below a defined threshold. The main controller 726 can determine that a change in loss across the transmission line 750 between the main signal booster 720 and the inline signal booster 730 has occurred when the signal strength of the ISM signal is below the defined threshold. Alternatively, the inline controller 736 can identify an ISM signal received from the main signal booster 720 via the transmission line 750. The inline controller 736 can determine that a signal strength of the ISM signal received from the main signal booster 720 is below the defined threshold. The inline controller 736 can determine that a change in loss across the transmission line 750 between the main signal booster 720 and the inline signal booster 730 has occurred when the signal strength of the ISM signal is below the defined threshold.

In one example, a first technique that involves the comparison of the DL and UL RSSIs can be used to determine whether there are changes in transmission line loss between the main signal booster 720 and the inline signal booster 730, as well as a second technique that involves the signal strengths of the ISM signals. In other words, two independent techniques can be used to determine the changes in the transmission line loss. In one example, both techniques can be used to determine the changes in the transmission line loss. Alternatively, the first technique or the second technique can be used to determine the changes in the transmission line loss.

Figure 8:
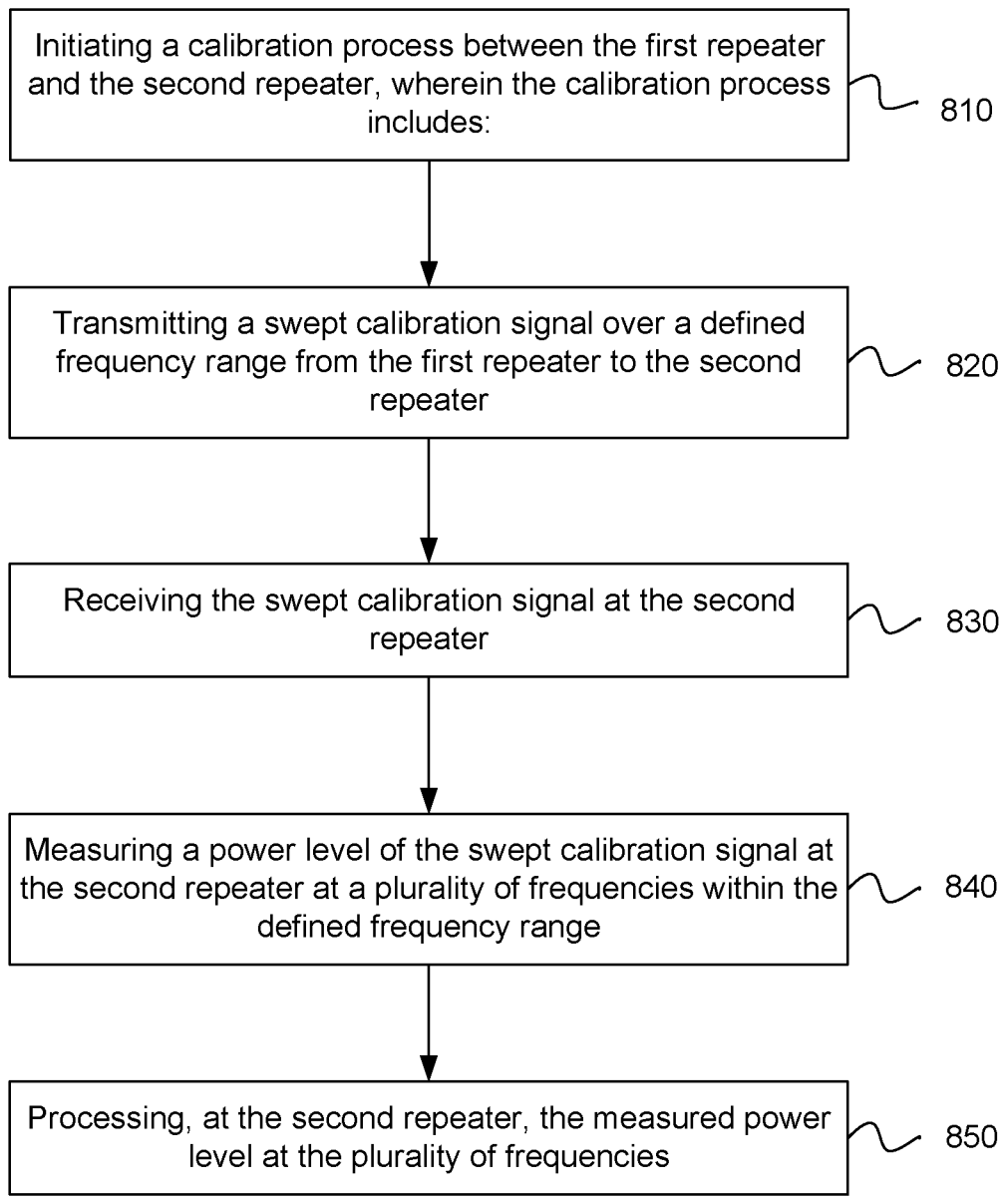
FIG. 8 illustrates functionality of a repeater in accordance with an example.

FIG. 8 illustrates functionality of a repeater. The repeater can include a first repeater, and a second repeater that is communicatively coupled to the first repeater. The first repeater can perform the operation of: initiating a calibration process between the first repeater and the second repeater, as in block 810. The calibration process can include: transmitting a swept calibration signal over a defined frequency range from the first repeater to the second repeater, as in block 820. The calibration process can include: receiving the swept calibration signal at the second repeater, as in block 830. The calibration process can include: measuring a power level of the swept calibration signal at the second repeater at a plurality of frequencies within the defined frequency range, as in block 840. The calibration process can include: processing, at the second repeater, the measured power level at the plurality of frequencies, as in block 850.

Figure 9:
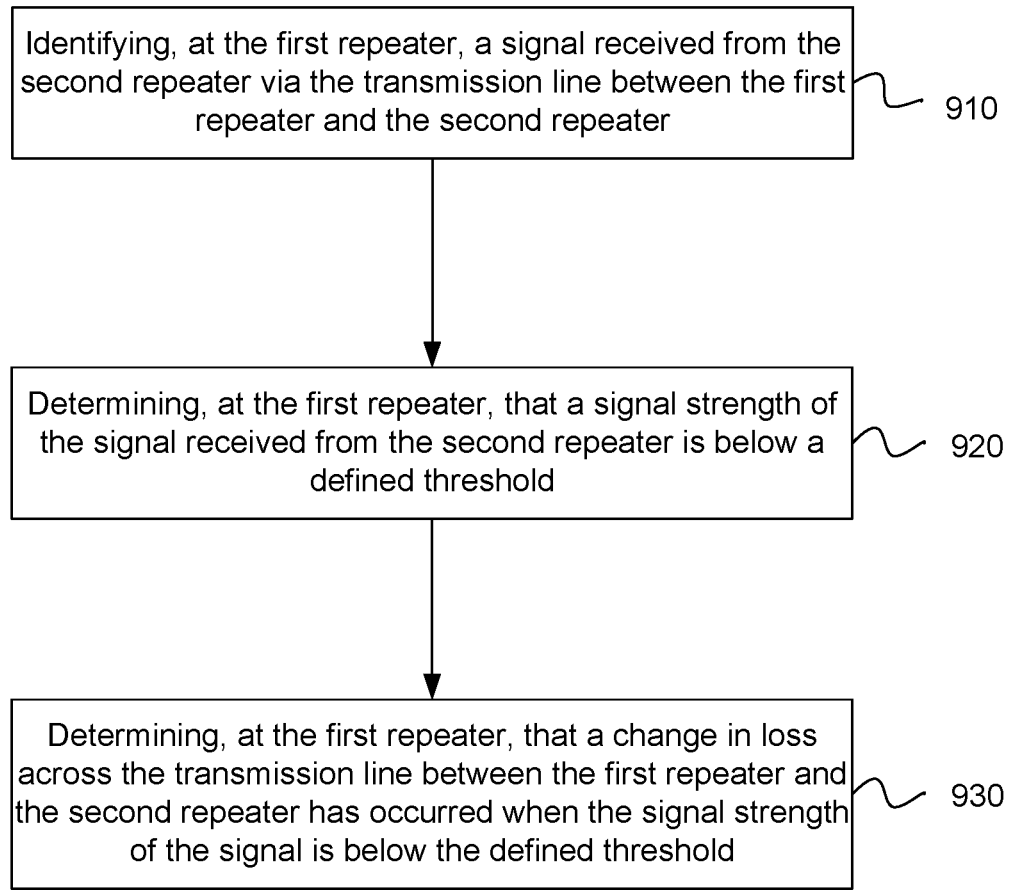
FIG. 9 is a flowchart illustrating operations for determining a change in transmission line loss across a transmission line between a first repeater and a second repeater in a repeater system in accordance with an example.

FIG. 9 is a flowchart illustrating a method for determining a change in transmission line loss across a transmission line between a first repeater and a second repeater in a repeater system. The method can be executed as instructions on a machine, where the instructions are included on at least one computer readable medium or one non-transitory machine readable storage medium. The method can include the operation of: identifying, at the first repeater, a signal received from the second repeater via the transmission line between the first repeater and the second repeater, as in block 910. The method can include the operation of: determining, at the first repeater, that a signal strength of the signal received from the second repeater is below a defined threshold, as in block 920. The method can include the operation of: determining, at the first repeater, that a change in transmission line loss across the transmission line between the first repeater and the second repeater has occurred when the signal strength of the signal is below the defined threshold, as in block 930.

Figure 10:
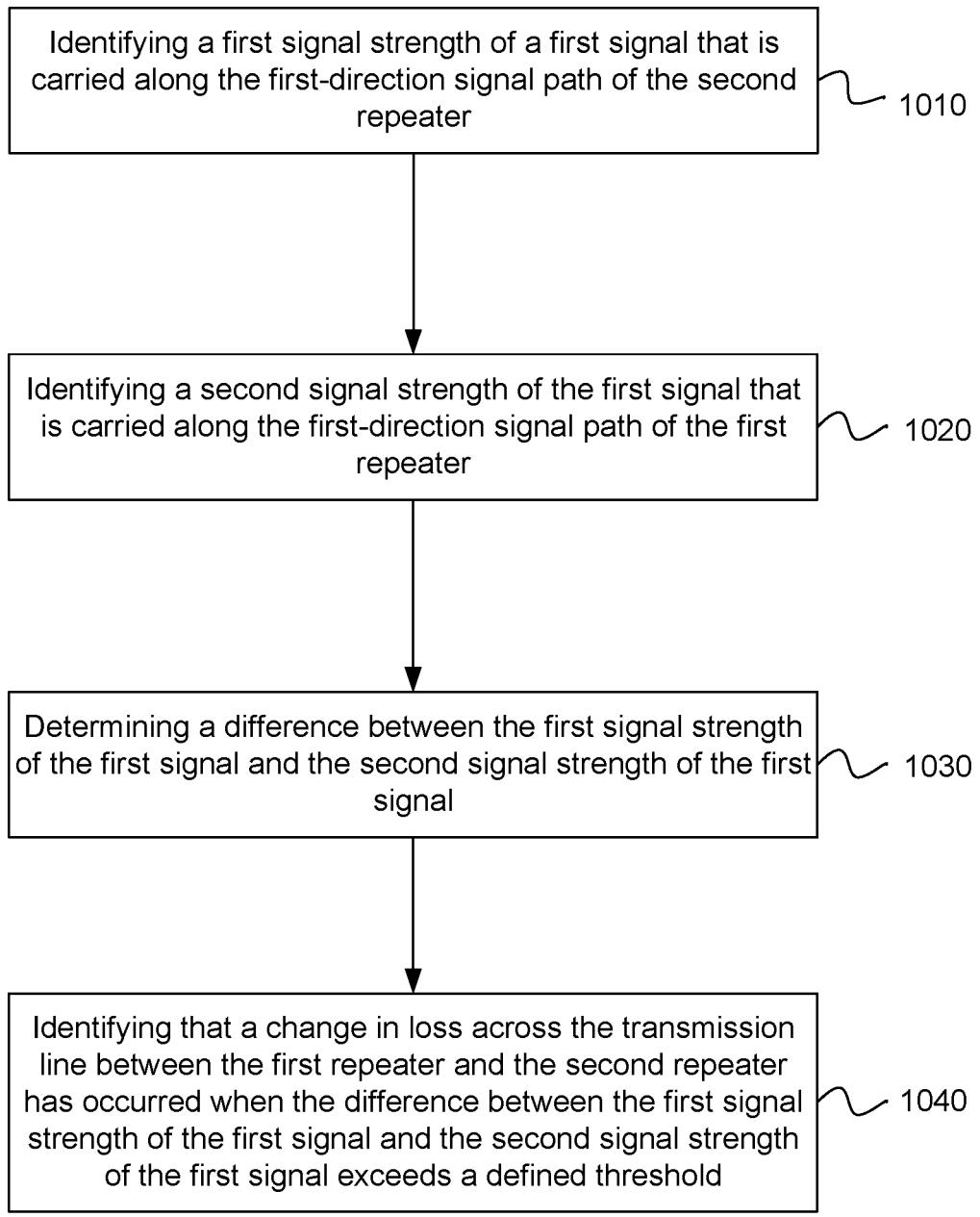
FIG. 10 is a flowchart illustrating operations for determining a change in transmission line loss across a transmission line between a first repeater and a second repeater in a repeater system in accordance with an example.

FIG. 10 is a flowchart illustrating a method for determining a change in transmission line loss across a transmission line between a first repeater and a second repeater in a repeater system. The method can be executed as instructions on a machine, where the instructions are included on at least one computer readable medium or one non-transitory machine readable storage medium. The method can include the operation of: identifying a first signal strength of a first signal that is carried along a first-direction signal path of the second repeater, as in block 1010. The method can include the operation of: identifying a second signal strength of the first signal that is carried along the first-direction signal path of the first repeater, as in block 1020. The method can include the operation of: determining a difference between the first signal strength of the first signal and the second signal strength of the first signal, as in block 1030. The method can include the operation of: identifying that a change in loss across the transmission line between the first repeater and the second repeater has occurred when the difference between the first signal strength of the first signal and the second signal strength of the first signal exceeds a defined threshold, as in block 1040.

Figure 11:
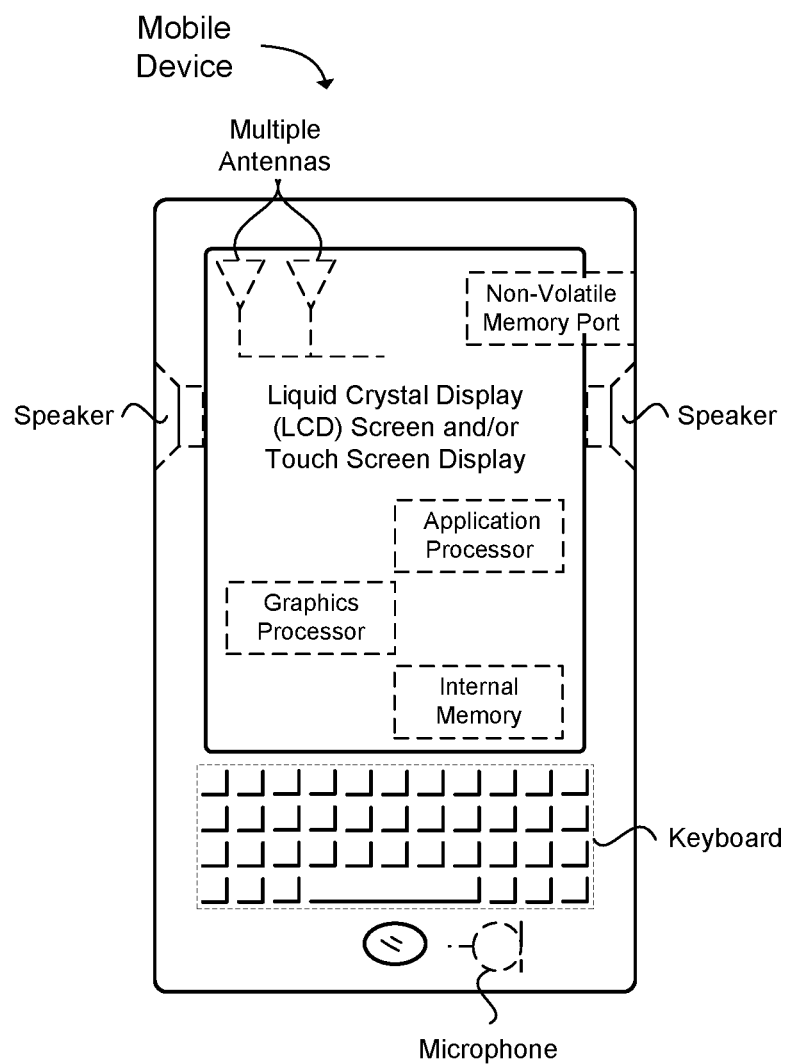
FIG. 11 illustrates a wireless device in accordance with an example.

FIG. 11 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater system, comprising: a first repeater; and a second repeater that is communicatively coupled to the first repeater via a transmission line between the first repeater and the second repeater, wherein the first repeater includes a controller operable to: identify an industrial, scientific, and medical (ISM) signal received from the second repeater via the transmission line; determine that a signal strength of the ISM signal received from the second repeater is below a defined threshold; and determine that a change in loss across the transmission line between the first repeater and the second repeater has occurred when the signal strength of the ISM signal is below the defined threshold.

Example 2 includes the repeater system of Example 1, wherein the controller in the first repeater is operable to send an indication signal to an indicator of the repeater system when the change in loss is determined to occur.

Example 3 includes the repeater system of Examples 1 to 2, wherein the controller in the first repeater is operable to initiate a calibration process between the first repeater and the second repeater when the change in loss is determined to occur.

Example 4 includes the repeater system of Examples 1 to 3, wherein the controller in the first repeater is operable to determine that the signal strength of the ISM signal is below the defined threshold based on a received signal strength indicator (RSSI) of the ISM signal.

Example 5 includes the repeater system of Examples 1 to 4, wherein the controller in the first repeater is operable to: determine an absence of an ISM signal received from the second repeater during a period of time; and determine that the change in loss across the transmission line between the first repeater and the second repeater has occurred due to the absence of the ISM signal.

Example 6 includes the repeater system of Examples 1 to 5, wherein the transmission line between the first repeater and the second repeater is a radio frequency (RF) wired signal path.

Example 7 includes the repeater system of Examples 1 to 6, wherein the transmission line between the first repeater and the second repeater is a coaxial cable.

Example 8 includes the repeater system of Examples 1 to 7, further comprising one or more of a splitter or a tap circuit that is inserted between the first repeater and the second repeater.

Example 9 includes the repeater system of Examples 1 to 8, wherein the first repeater is a main repeater and the second repeater is an in-line repeater.

Example 10 includes the repeater system of Examples 1 to 9, wherein the first repeater is an in-line repeater and the second repeater is a main repeater.

Example 11 includes a repeater system, comprising: a first repeater; and a second repeater that is communicatively coupled to the first repeater via a transmission line between the first repeater and the second repeater, wherein the first repeater includes a controller operable to determine that a change in loss across the transmission line between the first repeater and the second repeater has occurred based on signaling between the first repeater and the second repeater.

Example 12 includes the repeater system of Example 11, wherein the controller in the first repeater is operable to initiate a calibration sequence between the first repeater and the second repeater when the change in loss is detected across the transmission line between the first repeater and the second repeater.

Example 13 includes the repeater system of any of Examples 11 to 12, wherein the controller in the first repeater is operable to: identify a signal received from the second repeater; determine that a signal strength of the signal received from the second repeater is below a defined threshold; and determine that the change in loss across the transmission line between the first repeater and the second repeater has occurred when the signal strength of the signal is below the defined threshold.

Example 14 includes the repeater system of any of Examples 11 to 13, wherein the controller in the first repeater is operable to determine that the signal strength of the signal is below the defined threshold based on a received signal strength indicator (RSSI) of the signal.

Example 15 includes the repeater system of any of Examples 11 to 14, wherein the controller in the first repeater is operable to: receive a plurality of calibration tones from the second repeater, wherein the calibration tones are continuously sent to the first repeater in accordance with a defined periodicity; detect an interrupt in the calibration tones that are being received from the second repeater; and determine that the change in loss across the transmission line between the first repeater and the second repeater has occurred due to the interrupt in the calibration tones being received from the second repeater.

Example 16 includes the repeater system of any of Examples 11 to 15, wherein the calibration tones are received at the first repeater from the second repeater over an industrial, scientific, and medical (ISM) radio band.

Example 17 includes the repeater system of any of Examples 11 to 16, wherein the signaling between the first repeater and the second repeater is industrial, scientific, and medical (ISM) signaling.

Example 18 includes the repeater system of any of Examples 11 to 17, wherein the first repeater is a main repeater and the second repeater is an in-line repeater.

Example 19 includes the repeater system of any of Examples 11 to 18, wherein the first repeater is an in-line repeater and the second repeater is a main repeater.

Example 20 includes a repeater system, comprising: a first repeater; and a second repeater that is communicatively coupled to the first repeater, wherein the first repeater is operable to initiate a calibration process between the first repeater and the second repeater, wherein the calibration process includes: transmitting a swept calibration signal over a defined frequency range from the first repeater to the second repeater; receiving the swept calibration signal at the second repeater; measuring a power level of the swept calibration signal at the second repeater at a plurality of frequencies within the defined frequency range; and processing, at the second repeater, the measured power level at the plurality of frequencies.

Example 21 includes the repeater system of Example 20, wherein processing the measured power level at the plurality of frequencies includes averaging the measured power level at the plurality of frequencies.

Example 22 includes the repeater system of any of Examples 20 to 21, wherein the swept calibration signal is transmitted over the defined frequency range to mitigate a voltage standing wave ratio (VSWR) ripple over a transmission line between the first repeater and the second repeater.

Example 23 includes a method for determining a change in loss across a transmission line between a first repeater and a second repeater in a repeater system, the method comprising: identifying, at the first repeater, a signal received from the second repeater via the transmission line between the first repeater and the second repeater; determining, at the first repeater, that a signal strength of the signal received from the second repeater is below a defined threshold; and determining, at the first repeater, that a change in loss across the transmission line between the first repeater and the second repeater has occurred when the signal strength of the signal is below the defined threshold.

Example 24 includes the method of Example 23, further comprising sending an indication signal to an indicator of the repeater system when the change in loss is determined to occur.

Example 25 includes the method of any of Examples 23 to 24, further comprising initiating a calibration process between the first repeater and the second repeater when the change in loss is determined to occur.

Example 26 includes the method of any of Examples 23 to 25, further comprising determining that the signal strength of the ISM signal is below the defined threshold based on a received signal strength indicator (RSSI) of the signal.

Example 27 includes the method of any of Examples 23 to 26, further comprising: determining an absence of a signal received from the second repeater during a period of time; and determining that the change in loss across the transmission line between the first repeater and the second repeater has occurred due to the absence of the signal.

Example 28 includes the method of any of Examples 23 to 27, wherein the signal received from the second repeater is an industrial, scientific, and medical (ISM) signal.

Example 29 includes the method of any of Examples 23 to 28, wherein the transmission line between the first repeater and the second repeater is a radio frequency (RF) wired signal path.

Example 30 includes the method of any of Examples 23 to 29, wherein: the first repeater is a main repeater and the second repeater is an in-line repeater; or the first repeater is an in-line repeater and the second repeater is a main repeater.

Example 31 includes a repeater system, comprising: a first repeater that includes a first controller and a first-direction signal path; a second repeater that includes a second controller and a first-direction signal path; and a transmission line that communicatively couples the first repeater and the second repeater; wherein the first controller or the second controller is operable to: identify a first signal strength of a first signal that is carried along the first-direction signal path of the second repeater; identify a second signal strength of the first signal that is carried along the first-direction signal path of the first repeater; determine a difference between the first signal strength of the first signal and the second signal strength of the first signal; identify that a change in loss across the transmission line between the first repeater and the second repeater has occurred when the difference between the first signal strength of the first signal and the second signal strength of the first signal exceeds a defined threshold.

Example 32 includes the repeater system of Example 31, wherein: the first signal is one of: a downlink signal or an uplink signal, and the first-direction signal path of the first repeater and the second repeater is one of: a downlink signal path or an uplink signal path.

Example 33 includes the repeater system of any of Examples 31 to 32, wherein the first signal strength of the first signal is a first received signal strength indicator (RSSI) and the second signal strength of the first signal is a second RSSI.

Example 34 includes the repeater system of any of Examples 31 to 33, wherein: the first repeater includes a detector to determine the second signal strength of the first signal that is carried along the first-direction signal path of the first repeater; and the second repeater includes a detector to determine the first signal strength of the first signal that is carried along the first-direction signal path of the second repeater.

Example 35 includes the repeater system of any of Examples 31 to 34, wherein the first controller or the second controller is further operable to: identify a first signal strength of a second signal that is carried along a second-direction signal path of the first repeater; identify a second signal strength of the second signal that is carried along a second-direction signal path of the second repeater; determine a difference between the first signal strength of the second signal and the second signal strength of the second signal; identify that the change in loss across the transmission line between the first repeater and the second repeater has occurred when the difference between the first signal strength of the second signal and the second signal strength of the second signal exceeds the defined threshold.

Example 36 includes the repeater system of any of Examples 31 to 35, wherein: the second signal is a downlink signal or an uplink signal; and the second-direction signal path of the first repeater and the second repeater is a downlink signal path or an uplink signal path.

Example 37 includes the repeater system of any of Examples 31 to 36, wherein the first signal strength of the second signal is a first received signal strength indicator (RSSI) and the second signal strength of the second signal is a second RSSI.

Example 38 includes the repeater system of any of Examples 31 to 37, wherein: the first repeater includes a detector to determine the first signal strength of the second signal that is carried along the second-direction signal path of the first repeater; and the second repeater includes a detector to determine the second signal strength of the second signal that is carried along the second-direction signal path of the second repeater.

Example 39 includes the repeater system of any of Examples 31 to 38, wherein the defined threshold accounts for a known gain between the first repeater and the second repeater.

Example 40 includes the repeater system of any of Examples 31 to 39, wherein the first controller or the second controller is operable to determine that the change in loss across the transmission line between the first repeater and the second repeater has occurred for each band supported in the repeater system.

Example 41 includes the repeater system of any of Examples 31 to 40, wherein the first controller or the second controller is operable to initiate a calibration process between the first repeater and the second repeater when the change in loss is determined to occur.

Example 42 includes the repeater system of any of Examples 31 to 41, wherein the transmission line between the first repeater and the second repeater is a radio frequency (RF) wired signal path.

Example 43 includes the repeater system of any of Examples 31 to 42, wherein the transmission line between the first repeater and the second repeater is a coaxial cable.

Example 44 includes the repeater system of any of Examples 31 to 43, wherein: the first repeater is an in-line repeater and the second repeater is a main repeater; or the first repeater is a main repeater and the second repeater is an inline repeater.

Example 45 includes the repeater system of any of Examples 31 to 44, wherein: the first repeater is communicatively coupled to a server antenna; and the second repeater is communicatively coupled to a donor antenna.

Example 46 includes a repeater system, comprising: a first repeater that includes a first controller and a downlink signal path; a second repeater that includes a second controller and a downlink signal path; and a transmission line that communicatively couples the first repeater and the second repeater, wherein the first controller or the second controller is operable to: identify a first signal strength of a downlink signal that is carried along the downlink signal path of the second repeater; identify a second signal strength of the downlink signal that is carried along the downlink signal path of the first repeater; determine a difference between the first signal strength of the downlink signal and the second signal strength of the downlink signal; and determine that a change in loss across the transmission line between the first repeater and the second repeater has occurred when the difference between the first signal strength of the downlink signal and the second signal strength of the downlink signal exceeds a defined threshold.

Example 47 includes the repeater system of Example 46, wherein the first signal strength of the downlink signal is a first received signal strength indicator (RSSI) and the second signal strength of the downlink signal is a second RSSI.

Example 48 includes the repeater system of any of Examples 46 to 47, wherein: the first repeater includes a downlink detector to determine the second signal strength of the downlink signal that is carried along the downlink signal path of the first repeater; and the second repeater includes a downlink detector to determine the first signal strength of the downlink signal that is carried along the downlink signal path of the second repeater.

Example 49 includes a repeater system, comprising: a first repeater that includes a first controller and an uplink signal path; a second repeater that includes a second controller and an uplink signal path; and a transmission line that communicatively couples the first repeater and the second repeater, wherein the first controller or the second controller is operable to: identify a first signal strength of an uplink signal that is carried along the uplink signal path of the first repeater; identify a second signal strength of the uplink signal that is carried along the uplink signal path of the second repeater; determine that a difference between the first signal strength of the uplink signal and the second signal strength of the uplink signal exceeds a defined threshold; and determine that the change in loss across the transmission line between the first repeater and the second repeater has occurred when the difference between the first signal strength of the uplink signal and the second signal strength of the uplink signal exceeds the defined threshold.

Example 50 includes the repeater system of Example 49, wherein the first signal strength of the uplink signal is a first received signal strength indicator (RSSI) and the second signal strength of the uplink signal is a second RSSI.

Example 51 includes the repeater system of any of Examples 49 to 50, wherein: the first repeater includes an uplink detector to determine the first signal strength of the uplink signal that is carried along the uplink signal path of the first repeater; and the second repeater includes an uplink detector to determine the second signal strength of the uplink signal that is carried along the uplink signal path of the second repeater.

Example 52 includes a method for determining a change in loss across a transmission line between a first repeater and a second repeater in a repeater system, the method comprising: identifying, using a controller, a first signal strength of a first signal that is carried along a first-direction signal path of the second repeater; identifying a second signal strength of the first signal that is carried along a first-direction signal path of the first repeater; determining that a difference between the first signal strength of the first signal and the second signal strength of the first signal exceeds a defined threshold; and determining that a change in loss across the transmission line between the first repeater and the second repeater has occurred when the difference between the first signal strength of the first signal and the second signal strength of the first signal exceeds the defined threshold.

Example 53 includes the method of Example 52, wherein: the first signal is a downlink signal or an uplink signal; and the first-direction signal path of the first repeater and the second repeater is a downlink signal path or an uplink signal path.

Example 54 includes the method of any of Examples 52 to 53, wherein the first signal strength of the first signal is a first received signal strength indicator (RSSI) and the second signal strength of the first signal is a second RSSI.

Example 55 includes the method of any of Examples 52 to 54, further comprising: identifying, using the controller, a first signal strength of a second signal that is carried along a second-direction signal path of the first repeater; identifying a second signal strength of the second signal that is carried along a second-direction signal path of the second repeater; determining that a difference between the first signal strength of the second signal and the second signal strength of the second signal exceeds a defined threshold; and determining that a change in loss across the transmission line between the first repeater and the second repeater has occurred when the difference between the first signal strength of the second signal and the second signal strength of the second signal exceeds the defined threshold.

Example 56 includes the method of any of Examples 52 to 55, wherein: the second signal is a downlink signal or an uplink signal; and the second-direction signal path of the first repeater and the second repeater is a downlink signal path or an uplink signal path.

Example 57 includes the method of any of Examples 52 to 56, wherein the first signal strength of the second signal is a first received signal strength indicator (RSSI) and the second signal strength of the second signal is a second RSSI.

Example 58 includes a repeater system, comprising: a first repeater; and a second repeater that is communicatively coupled to the first repeater via a transmission line between the first repeater and the second repeater, wherein the first repeater includes a controller operable to: identify a signal received from the second repeater via the transmission line; determine that a signal strength of the signal received from the second repeater is below a defined threshold; and determine that a change in loss across the transmission line between the first repeater and the second repeater has occurred when the signal strength of the signal is below the defined threshold.

Example 59 includes the repeater system of Example 58, wherein the signal is an industrial, scientific, and medical (ISM) signal.

Example 60 includes the repeater system of any of Examples 58 to 59, wherein the signal is an out-of-band signal that is not amplified by the first repeater or the second repeater.

Example 61 includes the repeater system of any of Examples 58 to 60, wherein the controller in the first repeater is operable to send an indication signal to an indicator of the repeater system when the change in loss is determined to occur.

Example 62 includes the repeater system of any of Examples 58 to 61, wherein the controller in the first repeater is operable to initiate a calibration process between the first repeater and the second repeater when the change in loss is determined to occur.

Example 63 includes the repeater system of any of Examples 58 to 62, wherein the controller in the first repeater is operable to: determine an absence of a signal received from the second repeater during a period of time; and determine that the change in loss across the transmission line between the first repeater and the second repeater has occurred due to the absence of the signal.

Example 64 includes the repeater system of any of Examples 58 to 63, wherein the controller in the first repeater is further operable to: identify the signal strength of the signal when the signal is carried along an amplification and filtering signal path of the first repeater; identify a second signal strength of the signal when the signal is carried along an amplification and filtering signal path of the second repeater prior to being received at the first repeater; determine a difference between the signal strength of the signal when the signal is carried along the amplification and filtering signal path of the first repeater and the second signal strength of the signal when the signal is carried along the amplification and filtering signal path of the second repeater; and determine that the change in loss across the transmission line between the first repeater and the second repeater has occurred when the difference exceeds the defined threshold, wherein the signal is amplified and filtered by the amplification and filtering signal path of the first repeater and the amplification and filtering signal path of the second repeater.

Example 65 includes the repeater system of any of Examples 58 to 64, wherein the signal strength of the signal carried along the amplification and filtering signal path of the first repeater and the second signal strength of the signal carried along the amplification and filtering signal path of the second repeater is a first received signal strength indicator (RSSI) and a second RSSI, respectively.

Example 66 includes the repeater system of any of Examples 58 to 65, wherein: the first repeater includes a detector to identify the signal strength of the signal when the signal is carried along the amplification and filtering signal path of the first repeater; and the second repeater includes a detector to determine the second signal strength of the signal when the signal is carried along the amplification and filtering signal path of the second repeater.

Example 67 includes the repeater system of any of Examples 58 to 66, wherein: the amplification and filtering signal path of the first repeater and the amplification and filtering signal path of the second repeater are downlink signal paths; or the amplification and filtering signal path of the first repeater and the amplification and filtering signal path of the second repeater are uplink signal paths.

Example 68 includes the repeater system of any of Examples 58 to 67, wherein the defined threshold accounts for a known gain between the first repeater and the second repeater.

Example 69 includes the repeater system of any of Examples 58 to 68, wherein the transmission line between the first repeater and the second repeater is a wired signal path.

Example 70 includes the repeater system of any of Examples 58 to 69, wherein the transmission line between the first repeater and the second repeater is a coaxial cable.

Example 71 includes the repeater system of any of Examples 58 to 70, further comprising one or more of a splitter or a tap circuit that is inserted between the first repeater and the second repeater.

Example 72 includes the repeater system of any of Examples 58 to 71, wherein the first repeater is a main repeater and the second repeater is an in-line repeater.

Example 73 includes the repeater system of any of Examples 58 to 72, wherein the first repeater is an in-line repeater and the second repeater is a main repeater.

Example 74 includes a repeater system, comprising: a first repeater; and a second repeater that is communicatively coupled to the first repeater via a transmission line between the first repeater and the second repeater, wherein the first repeater includes a controller operable to determine that a change in loss across the transmission line between the first repeater and the second repeater has occurred based on signaling between the first repeater and the second repeater.

Example 75 includes the repeater system of Example 74, wherein the controller in the first repeater is operable to initiate a calibration sequence between the first repeater and the second repeater when the change in loss is detected across the transmission line between the first repeater and the second repeater.

Example 76 includes the repeater system of any of Examples 74 to 75, wherein the controller in the first repeater is operable to: identify a signal received from the second repeater; determine that a signal strength of the signal received from the second repeater is below a defined threshold; and determine that the change in loss across the transmission line between the first repeater and the second repeater has occurred when the signal strength of the signal is below the defined threshold, wherein the signal is an out-of-band signal that is not amplified by the first repeater or the second repeater.

Example 77 includes the repeater system of any of Examples 74 to 76, wherein the controller in the first repeater is operable to: identify a signal received from the second repeater; identify a signal strength of the signal when the signal is carried along an amplification and filtering signal path of the first repeater; identify a second signal strength of the signal when the signal is carried along an amplification and filtering signal path of the second repeater prior to being received at the first repeater; determine a difference between the signal strength and the second signal strength; and determine that the change in loss across the transmission line between the first repeater and the second repeater has occurred when the difference exceeds the defined threshold, wherein the signal is amplified and filtered by the amplification and filtering signal path of the first repeater and the amplification and filtering signal path of the second repeater.

Example 78 includes the repeater system of any of Examples 74 to 77, wherein the controller in the first repeater is operable to: receive a plurality of calibration tones from the second repeater, wherein the calibration tones are continuously sent to the first repeater in accordance with a defined periodicity; detect an interrupt in the calibration tones that are being received from the second repeater; and determine that the change in loss across the transmission line between the first repeater and the second repeater has occurred due to the interrupt in the calibration tones being received from the second repeater.

Example 79 includes the repeater system of any of Examples 74 to 78, wherein the signaling between the first repeater and the second repeater is industrial, scientific, and medical (ISM) signaling.

Example 80 includes the repeater system of any of Examples 74 to 79, wherein: the first repeater is a main repeater and the second repeater is an in-line repeater; or the first repeater is an in-line repeater and the second repeater is a main repeater.

Example 81 includes a method for determining a change in loss across a transmission line between a first repeater and a second repeater in a repeater system, the method comprising: identifying, at the first repeater, a signal received from the second repeater via the transmission line between the first repeater and the second repeater; determining, at the first repeater, that a signal strength of the signal received from the second repeater is below a defined threshold; and; determining, at the first repeater, that a change in loss across the transmission line between the first repeater and the second repeater has occurred when the signal strength of the signal is below the defined threshold.

Example 82 includes the method of Example 81, wherein the signal is an out-of-band signal that is not amplified by the first repeater or the second repeater.

Example 83 includes the method of any of Examples 81 to 82, further comprising sending an indication signal to an indicator of the repeater system when the change in loss is determined to occur.

Example 84 includes the method of any of Examples 81 to 83, further comprising initiating a calibration process between the first repeater and the second repeater when the change in loss is determined to occur.

Example 85 includes the method of any of Examples 81 to 84, further comprising: determining an absence of a signal received from the second repeater during a period of time; and determining that the loss across the transmission line between the first repeater and the second repeater has occurred due to the absence of the signal, wherein the signal is an out-of-band signal that is not amplified by the first repeater or the second repeater.

Example 86 includes the method of any of Examples 81 to 85, further comprising: identifying the signal strength of the signal when the signal is carried along an amplification and filtering signal path of the first repeater; identifying a second signal strength of the signal when the signal is carried along an amplification and filtering signal path of the second repeater prior to being received at the first repeater; determining a difference between the signal strength of the signal when the signal is carried along the amplification and filtering signal path of the first repeater and the second signal strength of the signal when the signal is carried along the amplification and filtering signal path of the second repeater; and determining that the change in loss across the transmission line between the first repeater and the second repeater has occurred when the difference exceeds the defined threshold, wherein the signal is amplified and filtered by the amplification and filtering signal path of the first repeater and the amplification and filtering signal path of the second repeater.

Example 87 includes a first repeater operable to determine a change in loss across a transmission line between the first repeater and a second repeater in a repeater system, the first repeater comprising: means for identifying, at the first repeater, a signal received from the second repeater via the transmission line between the first repeater and the second repeater; means for determining, at the first repeater, that a signal strength of the signal received from the second repeater is below a defined threshold; and means for determining, at the first repeater, that a change in loss across the transmission line between the first repeater and the second repeater has occurred when the signal strength of the signal is below the defined threshold.

Example 88 includes the first repeater of Example 87, wherein the signal is an out-of-band signal that is not amplified by the first repeater or the second repeater.

Example 89 includes the first repeater of any of Examples 87 to 88, further comprising means for sending an indication signal to an indicator of the repeater system when the change in loss is determined to occur.

Example 90 includes the first repeater of any of Examples 87 to 89, further comprising means for initiating a calibration process between the first repeater and the second repeater when the change in loss is determined to occur.

Example 91 includes the first repeater of any of Examples 87 to 90, further comprising: means for determining an absence of a signal received from the second repeater during a period of time; and means for determining that the loss across the transmission line between the first repeater and the second repeater has occurred due to the absence of the signal, wherein the signal is an out-of-band signal that is not amplified by the first repeater or the second repeater.

Example 92 includes the first repeater of any of Examples 87 to 91, further comprising: means for identifying the signal strength of the signal when the signal is carried along an amplification and filtering signal path of the first repeater; means for identifying a second signal strength of the signal when the signal is carried along an amplification and filtering signal path of the second repeater prior to being received at the first repeater; means for determining a difference between the signal strength of the signal when the signal is carried along the amplification and filtering signal path of the first repeater and the second signal strength of the signal when the signal is carried along the amplification and filtering signal path of the second repeater; and means for determining that the change in loss across the transmission line between the first repeater and the second repeater has occurred when the difference exceeds the defined threshold, wherein the signal is amplified and filtered by the amplification and filtering signal path of the first repeater and the amplification and filtering signal path of the second repeater.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater system, comprising:
a first repeater; and
a second repeater that is communicatively coupled to the first repeater via a transmission line between the first repeater and the second repeater,
wherein the first repeater includes a controller configured to:
identify a signal received from the second repeater via the transmission line;
determine that a signal strength of the signal received from the second repeater is below a defined threshold, wherein the defined threshold is based on a known gain between the first repeater and the second repeater; and
determine that a change in loss across the transmission line between the first repeater and the second repeater has occurred when the signal strength of the signal is below the defined threshold.

2. The repeater system of claim 1, wherein the signal is an industrial, scientific, and medical (ISM) signal.

3. The repeater system of claim 1, wherein the signal is an out-of-band signal that is not amplified by the first repeater or the second repeater.

4. The repeater system of claim 1, wherein the controller in the first repeater is further configured to send an indication signal to a display of the repeater system when the change in loss is determined to occur.

5. The repeater system of claim 1, wherein the controller in the first repeater is further configured to initiate a calibration process between the first repeater and the second repeater when the change in loss is determined to occur.

6. The repeater system of claim 1, wherein the controller in the first repeater is further configured to:
determine an absence of a second signal received from the second repeater during a period of time; and
determine that the change in loss across the transmission line between the first repeater and the second repeater has occurred due to the absence of the second signal.

7. The repeater system of claim 1, wherein the controller in the first repeater is further configured to:
identify the signal strength of the signal when the signal is carried along an amplification and filtering signal path of the first repeater;
identify a second signal strength of the signal when the signal is carried along an amplification and filtering signal path of the second repeater prior to being received at the first repeater;
determine a difference between the signal strength of the signal when the signal is carried along the amplification and filtering signal path of the first repeater and the second signal strength of the signal when the signal is carried along the amplification and filtering signal path of the second repeater; and
determine that the change in loss across the transmission line between the first repeater and the second repeater has occurred when the difference exceeds the defined threshold,
wherein the signal is amplified and filtered by the amplification and filtering signal path of the first repeater and the amplification and filtering signal path of the second repeater.

8. The repeater system of claim 7, wherein the signal strength of the signal carried along the amplification and filtering signal path of the first repeater and the second signal strength of the signal carried along the amplification and filtering signal path of the second repeater is a first received signal strength indicator (RSSI) and a second RSSI, respectively.

9. The repeater system of claim 7, wherein:
the first repeater further includes a detector configured to identify the signal strength of the signal when the signal is carried along the amplification and filtering signal path of the first repeater; and
the second repeater includes a detector configured to determine the second signal strength of the signal when the signal is carried along the amplification and filtering signal path of the second repeater.

10. The repeater system of claim 7, wherein:
the amplification and filtering signal path of the first repeater and the amplification and filtering signal path of the second repeater are downlink signal paths; or
the amplification and filtering signal path of the first repeater and the amplification and filtering signal path of the second repeater are uplink signal paths.

11. The repeater system of claim 7, wherein the defined threshold accounts for the known gain between the first repeater and the second repeater.

12. The repeater system of claim 1, wherein the transmission line between the first repeater and the second repeater is a wired signal path.

13. The repeater system of claim 1, wherein the transmission line between the first repeater and the second repeater is a coaxial cable.

14. The repeater system of claim 1, wherein the first repeater is a main repeater and the second repeater is an in-line repeater.

15. The repeater system of claim 1, wherein the first repeater is an in-line repeater and the second repeater is a main repeater.

16. A repeater system, comprising:
a first repeater; and
a second repeater that is communicatively coupled to the first repeater via a transmission line between the first repeater and the second repeater,
wherein the first repeater includes a controller configured to determine that a change in loss across the transmission line between the first repeater and the second repeater has occurred based on a signal between the first repeater and the second repeater, wherein a signal strength of the signal is below a defined threshold, and the defined threshold is based on a known gain between the first repeater and the second repeater.

17. The repeater system of claim 16, wherein the controller in the first repeater is further configured to initiate a calibration sequence between the first repeater and the second repeater when the change in loss is detected across the transmission line between the first repeater and the second repeater.

18. The repeater system of claim 16, wherein the controller in the first repeater is further configured to:
identify a signal received from the second repeater;
determine that the signal strength of the signal received from the second repeater is below a defined threshold for the second repeater; and
determine that the change in loss across the transmission line between the first repeater and the second repeater has occurred when the signal strength of the signal received from the second repeater is below the defined threshold for the second repeater, wherein the signal received from the second repeater is an out-of-band signal that is not amplified by the first repeater or the second repeater.

19. The repeater system of claim 16, wherein the controller in the first repeater is further configured to:
identify a signal received from the second repeater;
identify a first signal strength of the signal received from the second repeater when the signal received from the second repeater is carried along an amplification and filtering signal path of the first repeater;
identify a second signal strength of the signal when the signal received from the second repeater is carried along an amplification and filtering signal path of the second repeater prior to being received at the first repeater;
determine a difference between the first signal strength and the second signal strength; and
determine that the change in loss across the transmission line between the first repeater and the second repeater has occurred when the difference exceeds the defined threshold,
wherein the signal received from the second repeater is amplified and filtered by the amplification and filtering signal path of the first repeater and the amplification and filtering signal path of the second repeater.

20. The repeater system of claim 16, wherein the controller in the first repeater is further configured to:
receive a plurality of calibration tones from the second repeater, wherein the calibration tones are continuously sent to the first repeater in accordance with a defined periodicity;
detect an interrupt in the calibration tones that are being received from the second repeater; and
determine that the change in loss across the transmission line between the first repeater and the second repeater has occurred due to the interrupt in the calibration tones being received from the second repeater.

21. The repeater system of claim 16, wherein the signal between the first repeater and the second repeater is an industrial, scientific, and medical (ISM) signal.

22. The repeater system of claim 16, wherein:
the first repeater is a main repeater and the second repeater is an in-line repeater; or
the first repeater is an in-line repeater and the second repeater is a main repeater.

23. A repeater system, comprising:
a first repeater; and
a second repeater that is communicatively coupled to the first repeater,
wherein the first repeater is configured to initiate a calibration process between the first repeater and the second repeater,
wherein the calibration process includes:
transmitting a swept calibration signal over a defined frequency range from the first repeater to the second repeater;
receiving the swept calibration signal at the second repeater;
measuring a power level of the swept calibration signal at the second repeater at a plurality of frequencies within the defined frequency range; and
processing, at the second repeater, the measured power level at the plurality of frequencies.

24. The repeater system of claim 23, wherein processing the measured power level at the plurality of frequencies includes averaging the measured power level at the plurality of frequencies.

25. The repeater system of claim 23, wherein the swept calibration signal is transmitted over the defined frequency range to mitigate a voltage standing wave ratio (VSWR) ripple over a transmission line between the first repeater and the second repeater.

26. A method for determining a change in loss across a transmission line between a first repeater and a second repeater in a repeater system, the method comprising:
identifying, at the first repeater, a signal received from the second repeater via the transmission line between the first repeater and the second repeater;
determining, at the first repeater, that a signal strength of the signal received from the second repeater is below a defined threshold, wherein the defined threshold is based on a known gain between the first repeater and the second repeater; and
determining, at the first repeater, that the change in loss across the transmission line between the first repeater and the second repeater has occurred when the signal strength of the signal is below the defined threshold.

27. The method of claim 26, wherein the signal is an out-of-band signal that is not amplified by the first repeater or the second repeater.

28. The method of claim 26, further comprising sending an indication signal to a display of the repeater system when the change in loss is determined to occur.

29. The method of claim 26, further comprising initiating a calibration process between the first repeater and the second repeater when the change in loss is determined to occur.

30. The method of claim 26, further comprising:
determining an absence of a second signal received from the second repeater during a period of time; and
determining that the change in loss across the transmission line between the first repeater and the second repeater has occurred due to the absence of the second signal, wherein the second signal is an out-of-band signal that is not amplified by the first repeater or the second repeater.

31. The method of claim 26, further comprising:
identifying the signal strength of the signal when the signal is carried along an amplification and filtering signal path of the first repeater;
identifying a second signal strength of the signal when the signal is carried along an amplification and filtering signal path of the second repeater prior to being received at the first repeater;
determining a difference between the signal strength of the signal when the signal is carried along the amplification and filtering signal path of the first repeater and the second signal strength of the signal when the signal is carried along the amplification and filtering signal path of the second repeater; and
determining that the change in loss across the transmission line between the first repeater and the second repeater has occurred when the difference exceeds the defined threshold,
wherein the signal is amplified and filtered by the amplification and filtering signal path of the first repeater and the amplification and filtering signal path of the second repeater.

* * * * *